(12) United States Patent
Parks et al.

(10) Patent No.: US 6,427,160 B1
(45) Date of Patent: Jul. 30, 2002

(54) METHOD AND SYSTEM FOR TESTING FLOATING POINT LOGIC

(75) Inventors: Michael Parks, Union City; Douglas M. Priest, Mountain View, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/372,183

(22) Filed: Aug. 10, 1999

(51) Int. Cl.[7] .............................................. G06F 11/263
(52) U.S. Cl. ..................... 708/530; 708/497; 714/736
(58) Field of Search ................................ 708/530, 497, 708/551; 714/736

(56) References Cited

U.S. PATENT DOCUMENTS

| | | | | |
|---|---|---|---|---|
| 5,887,003 A | * | 3/1999 | Ranson et al. | 714/736 |
| 6,101,523 A | * | 8/2000 | Chen et al. | 708/530 |
| 6,108,772 A | * | 8/2000 | Sharangpani | 708/551 |

OTHER PUBLICATIONS

Doug Priest, "Strategies for Testing Floating Point Arithmetic" (USA, 1997).
W. Kahan, "A Test for Correctly Rounded SQRT" (USA, 1996).
W. Kahan, "Checking Whether Floating–Point is Correctly Rounded" (USA, 1987).
Ping Tak Peter Tang, "Testing Computer Arithmetic by Elemental Number Theory" (USA, 1989).

\* cited by examiner

*Primary Examiner*—David H. Malzahn
(74) *Attorney, Agent, or Firm*—The Law Firm of John R. Carpenter

(57) ABSTRACT

In a computer system, a method and system for verifying whether a floating-point logic unit correctly directly rounds floating-point numbers when conducting multiplication, square root, and division operations. A bit sequence that represents a directed boundary condition for a mathematical operation is identified. This sequence is then recast in terms of a series of integer equations. A recurrence is used to solve these equations to produce difficult test data. When solving the equations, any intermediate terms that exceed the computer's precision are discarded. The logic then conducts the mathematical operation under inspection using the test cases. The logic's computed value is then compared to an expected value. If the computed value equals the expected value, the logic has accurately performed the operation. If not, the logic is faulty.

37 Claims, 18 Drawing Sheets

METHOD AND SYSTEM FOR TESTING FLOATING POINT LOGIC

BACKGROUND OF THE INVENTION

1. Field of the Invention

The present invention relates generally to computer systems, and more specifically to a method and system for testing the accuracy of floating-point logic devices.

2. Related Art

Floating-point notation is used to represent numbers in a computer system. This is a scientific notation format in which numbers are represented by two components: a significant and an exponent according to a given base. The significant, also known as a mantissa, specifies the significant digits in the number, which are those digits that form the sequence from the first non-zero digit to the least significant digit. The more digits that are reserved for the significant, the greater the precision of the notation. The exponent specifies the binade of the number. The term "binade" refers to a set of numbers having the same sign and given exponent. For example, given a fixed N, a binade is the set of numbers t, such that $2^{N-1} <= t < 2^N$. The more digits that are reserved for the exponent, the greater the range of the notation.

To find the value of number represented in floating point notation, the base is raised to the power of the exponent, and the significand is multiplied by the result. For example, in base 10, the floating point representation of 820,000 is 8.2E+05. In this case, 8.2 is the significand and 5 is the exponent. The number's value is created using the two steps outlined above. That is, the base, 10, is raised to the power of the exponent, 5, and the result, 100,000, is multiplied by the significand, 8.2, to yield 820,000.

Computerized systems represent numbers in binary form. As a result, these systems usually represent floating-point numbers using a base of 2. Consequently, a computer's floating point notation is less intuitive than the decimal example discussed above. Nevertheless, the computer's representation of the significand and the exponent can be conceptualized. To do this, a standard for representing numbers in a binary floating-point format will be examined. The Institute of Electrical and Electronics Engineers' Standard 754 defines what is known as single and double precision representations. In single precision, 24 bits are used to represent the significand and 8 bits are used to represent the exponent. In double precision, 53 bits are used to represent the significand and 11 bits are used to represent the exponent. In fact, the standard itself specifies only 23 and 52 bits for the significands, but an additional bit of precision is implied, since the leading bit must by definition be a one. The standard also reserves one bit to signify the number's sign. By convention, the sign bit is decoded as "0" for positive and "1" for negative. Thus, the IEEE standard can be shown as:

| Sign | Exponent | Significand |
|---|---|---|
| 1 bit | 8 bits-single precision | 23 bits-single precision (plus 1 implied bit) |
| | 11 bits-double precision | 52 bits-double precision (plus 1 implied bit) |

Given the ranges for the significand and exponent, computer systems have to manipulate data of substantial size when performing floating-point arithmetic. And because the system must, after the desired operation has been performed, normalize the data back to the proper floating-point format, such operations require considerable computing power. In light of this, many microprocessors come with special floating-point logics, sometimes referred to as math coprocessors or numeric coprocessors, that are specially designed to perform floating-point arithmetic. These devices have registers that are sized according to the precision used. An alternative to such hardware is to provide software logic to perform the desired operations.

Regardless of what logic-type is used, there will be circumstances where the precision of the machine is insufficient to represent a number exactly. An example of this is Pi, which is the ratio of the circle's circumference to its diameter, and which has been calculated to be more than 50 billion digits. Hence, Pi and like values must be approximated before they can be stored in the register of a floating-point logic. Great care must taken to ensure that the approximation is correctly made. For incorrectly rounded values can snowball—especially when relied on in iterative schemes—and produce disastrous results. For example, not only could months of trials be wasted by the end-user of such flawed logic, but the manufacturer could become embroiled in costly recalls and public relation nightmares.

To ensure that approximations are uniform and accurately made, rounding standards for binary floating-point arithmetic were adopted in the IEEE Standard 754. One such standard is called "Round to Nearest," which requires that the representative value nearest to the infinitely precise result be delivered. For certain applications, however, tolerances may dictate that values be rounded in a particular direction. Realizing this, the IEEE incorporated "Directed Roundings" into the standard. These roundings are comprised of three types: Round-towards-Positive Infinity, Round-towards-Negative Infinity, and Round-towards-Zero, also referred to as Truncate. When rounding towards positive infinity, the rounded value is the format's value closest to and no less than the infinitely precise result. When rounding towards negative infinity, the rounded value is the format's value closest to and no greater than the infinitely precise result. And when rounding towards zero, the rounded value is the format's value closest to and no greater in magnitude than the infinitely precise result. Thus, for positive numbers, rounding towards zero will yield the same value as rounding towards negative infinity. Likewise, for negative numbers, rounding towards zero will yield the same value as rounding towards positive infinity. To appreciate how these roundings work, consider the square root of three, which is approximately 1.7. In a system having a precision of one decimal bit, the Round to Nearest and Round-Towards-Positive Infinity directed roundings would represent this value as 2, while the Truncate and Round-Towards-Negative Infinity roundings would represent this value as 1.

To ensure that a given logic conforms to IEEE standard 754, it must be rigorously tested against these rounding modes. The preferred embodiment of the present invention facilitates such testing.

INVENTION SUMMARY

Embodiments of the present invention provide methods and systems that allow for robust testing of a floating point logic. More specifically, embodiments provide computerized methods and systems for verifying whether a floating-point logic unit correctly performs directed rounding upon the results of mathematical operations of floating-point numbers. The testing is rigorous because the embodiments produce test data that lie on critical boundary conditions—data that could not practically be randomly produced. This data is then passed to the floating-point logic, which conducts the mathematical operation that is being tested, resulting in a rounded value. This value is then compared with the correctly rounded value, which the embodiment also produces. When these two values match, the logic is rounding correctly. When the values do not match, the logic is flawed.

BRIEF DRAWING DESCRIPTIONS

The accompanying drawings illustrate embodiments of the invention that will enable those skilled in the art to make and utilize the invention. In fact, these drawings, when considered with the written disclosure, will enable those skilled in the art to modify these embodiments in a manner that does not depart from the spirit and scope of the invention.

FIGS. 6, 7, 8, and 9 illustrate processing steps used by embodiments of the present invention to evaluate whether a logic correctly performs directed roundings of quotients.

Figure 10:
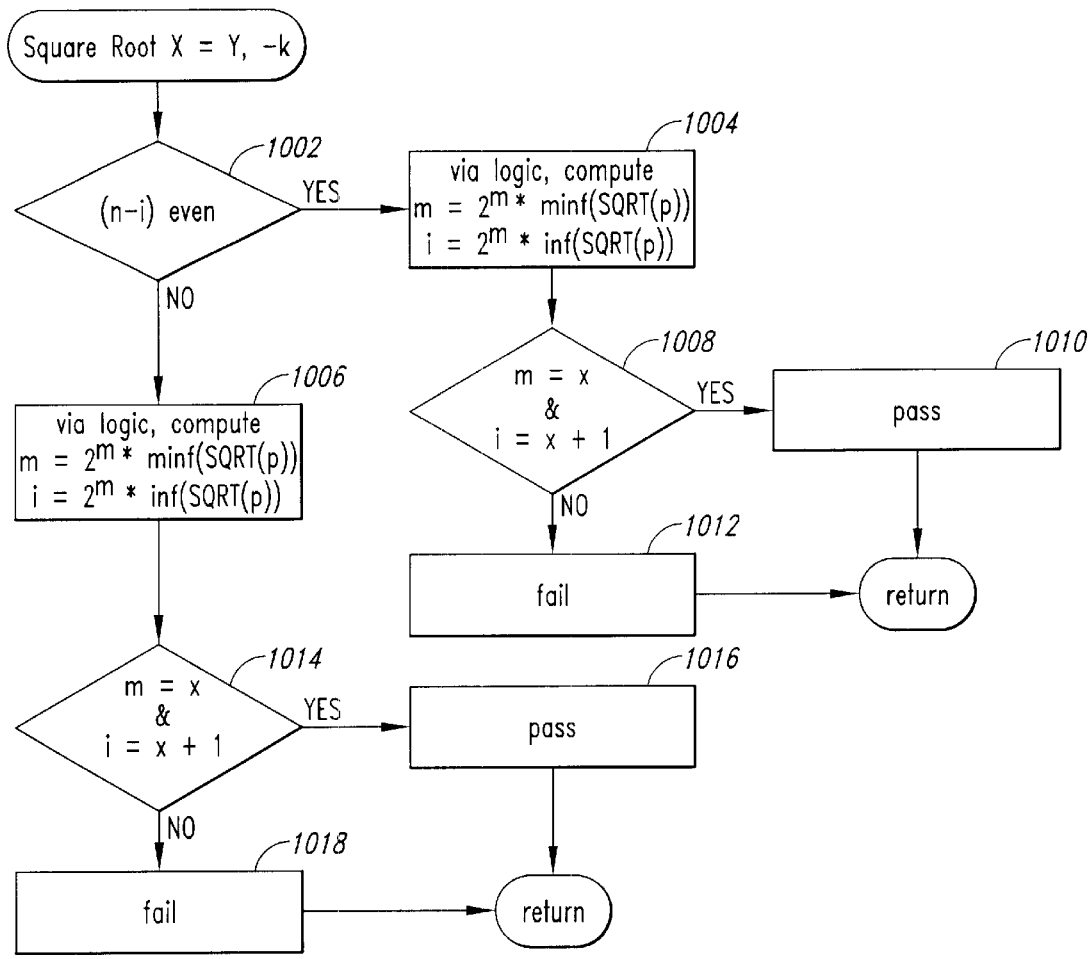
Figure 11:
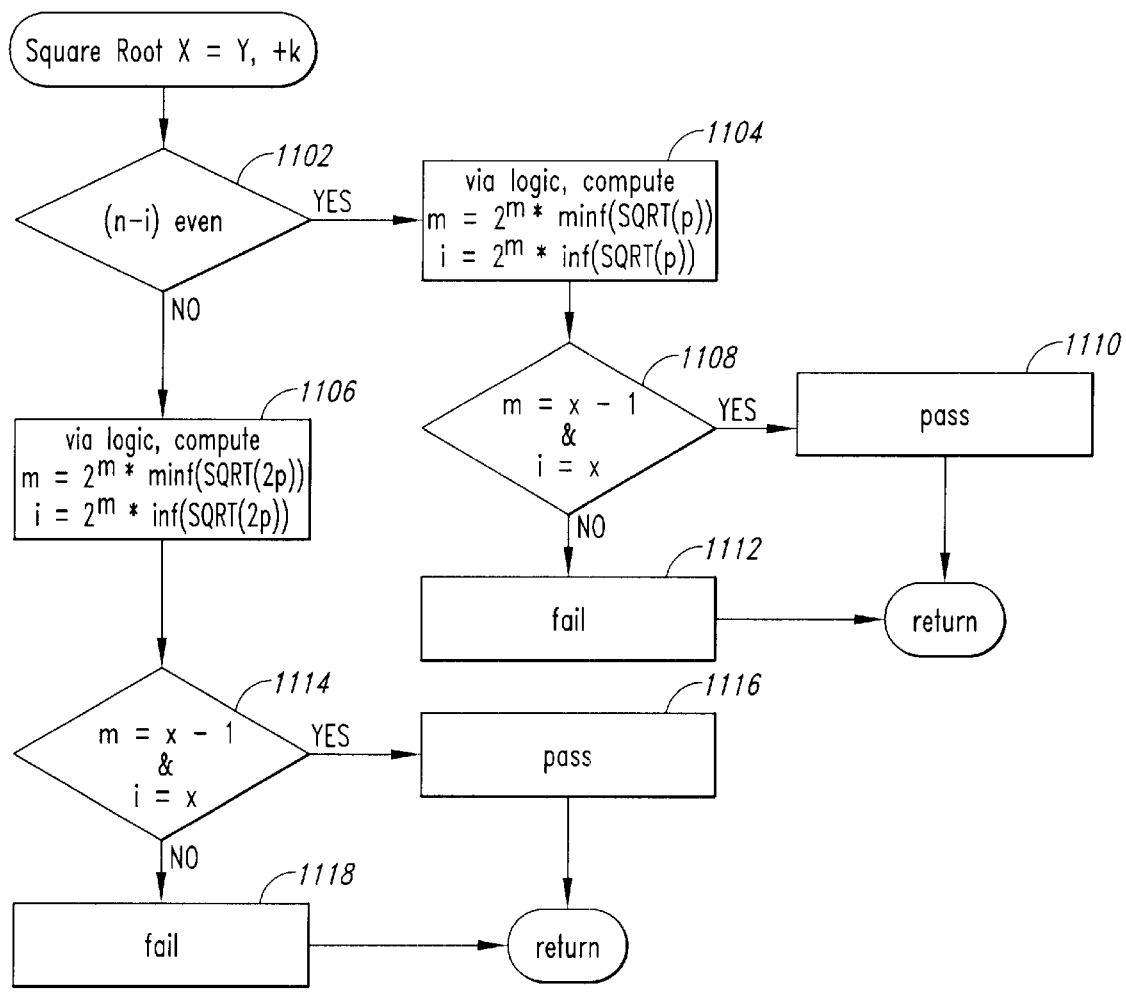

FIGS. 10 and 11 illustrate processing steps used by embodiments of the present invention to derive square root test cases from multiplication and division test cases.

Figure 12:
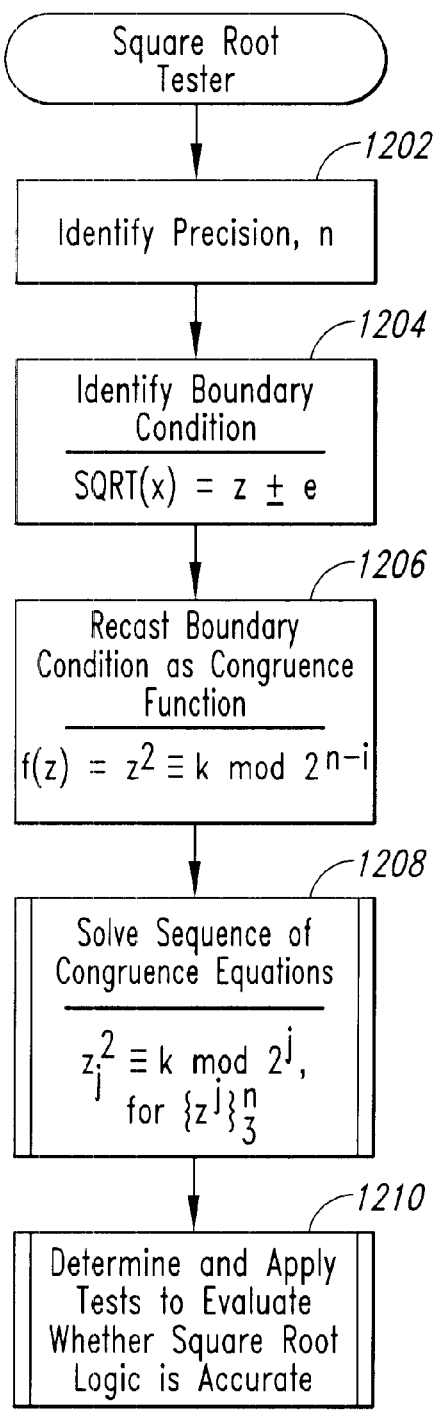

FIG. 12 depicts the processing steps used in a preferred embodiment to produce test cases for square root operations.

Figure 13:
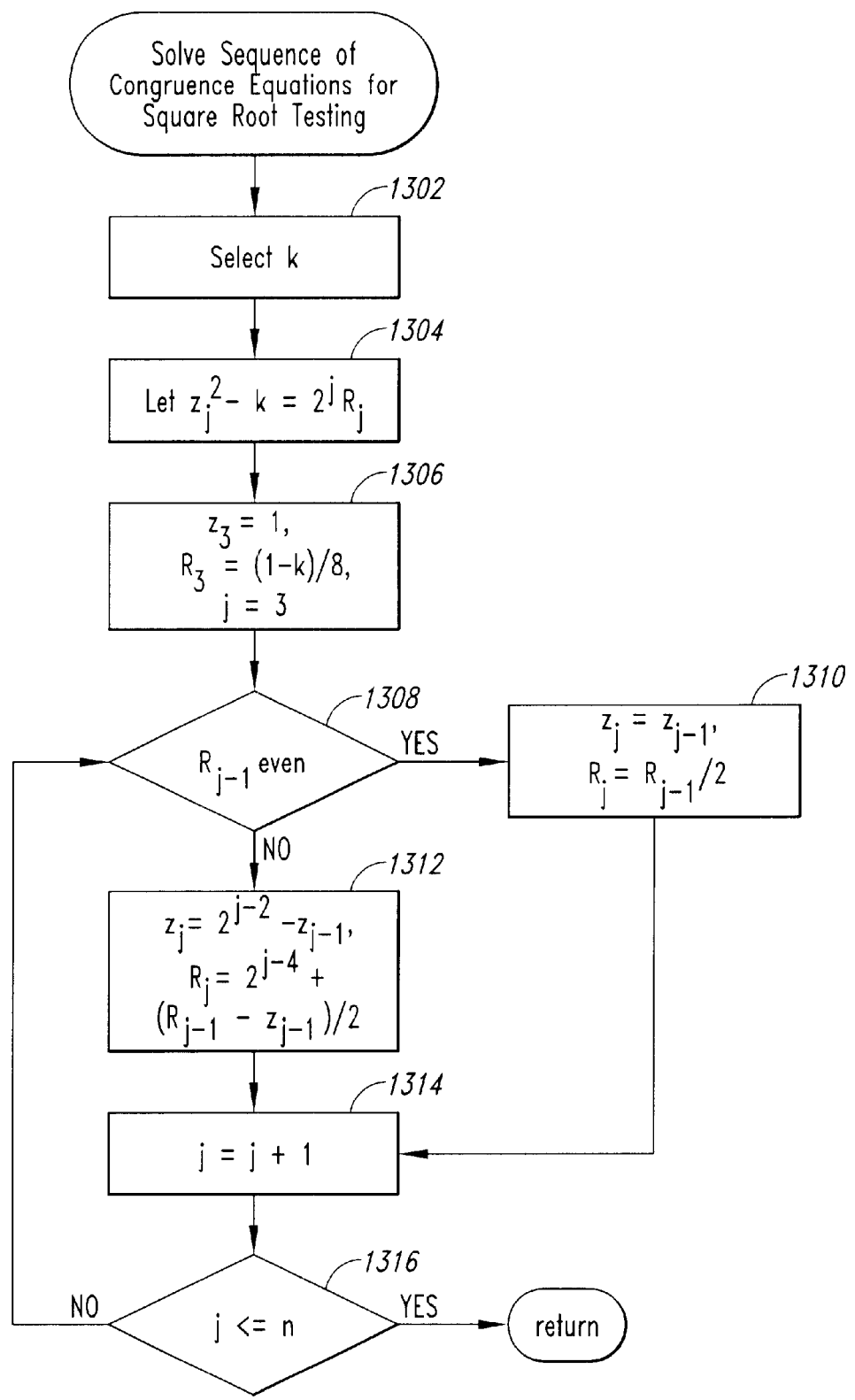

FIG. 13 illustrates the processing steps used in an embodiment of the invention to solve a sequence of congruence equations when testing directed roundings at boundaries produced by square root operations.

FIGS. 14A, 14B, 14C, and 14D depict the processing steps used in a preferred embodiment to determine and apply test cases derived for square root operations.

DETAILED DESCRIPTION

Embodiments of the invention will now be described with reference to the accompanying drawings. It is understood that the invention is not limited to these embodiments, as the teachings contained herein will enable others to modify these embodiments without departing from the spirit and scope of the invention. Accordingly, the invention encompasses all such modifications that are described by the appended claims and their equivalents.

Overview of the Detailed Description

The structure of this disclosure is as follows: A computer system embodying a preferred embodiment of the present invention is described. See FIG. 1. An overview of the processing steps used by a preferred embodiment to test the accuracy of a floating-point logics directed rounding capabilities is then explained. See FIG. 2. Next, processing steps that create test data by examining directed boundary conditions produced by multiplication operations are described. More specifically, a preferred embodiment produces this data by identifying unique bit patterns that represent directed rounding mode boundary conditions, recasting those patterns as congruence equations, and solving those equations. See FIGS. 3 & 4. Once the data has been produced, it is applied to evaluate the capabilities of the floating point logic. See FIGS. 5A & 5B. A valuable offshoot of this technique is next described: Each multiplication test case begets either two division test cases or one division and square root test case. These are in essence "free tests" as little computation is needed to employ them. See FIGS. 6, 7, 8, 9, 10, & 11. Next, processing steps used to create and apply test data corresponding to directed boundary conditions produced by square root operations are described. See FIGS. 12, 13, 14A, 14B, 14C, & 14D. Several examples and alternative embodiments are described throughout the detailed description. None of these embodiments or examples should be read as limiting the invention.

Figure 1:
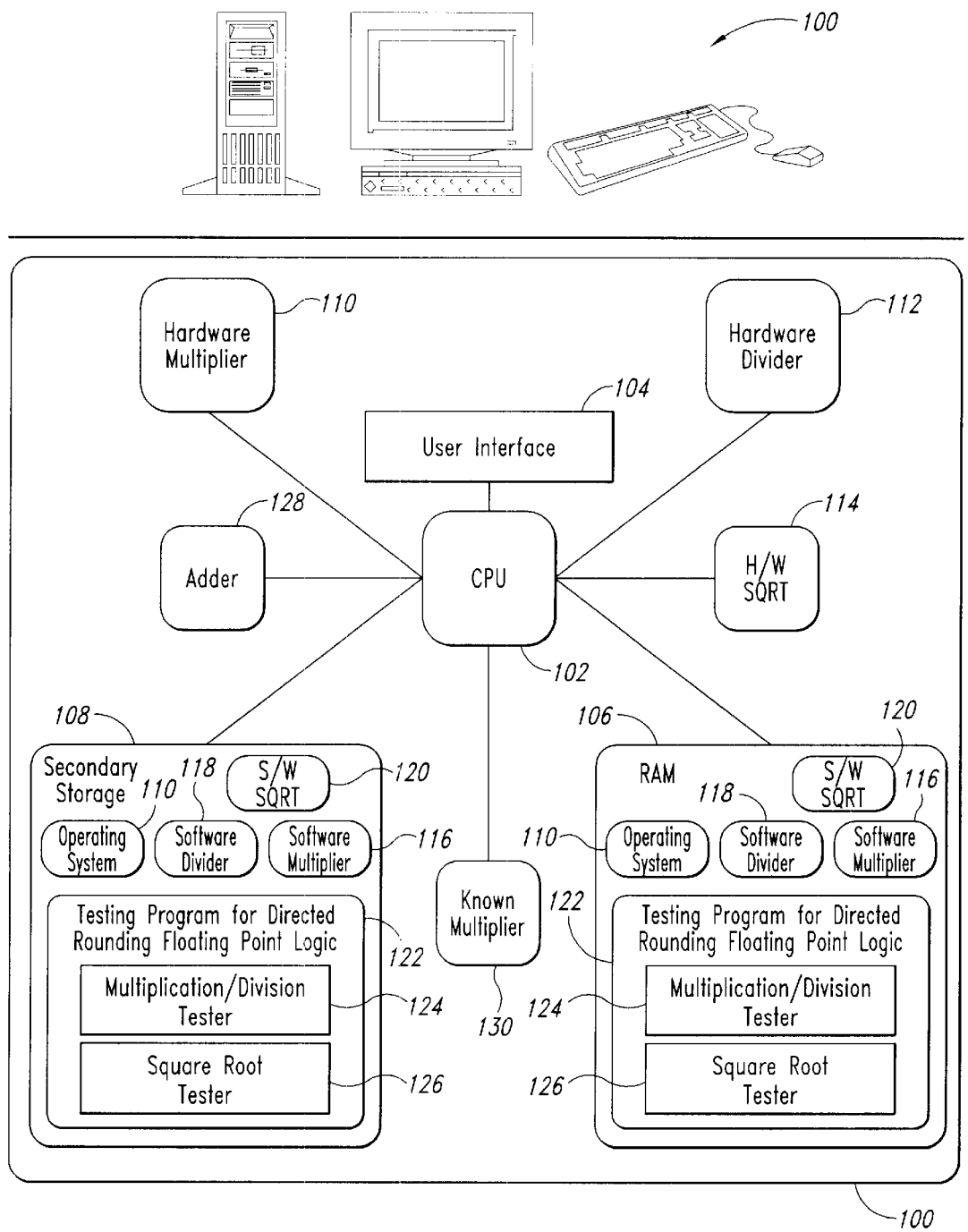
FIG. 1 depicts a computer system that tests floating point logic in accordance with an embodiment of the present invention.

FIG. 1: The Computer System

A computer system that tests floating-point logic in accordance with a preferred embodiment of the present invention is illustrated in FIG. 1. This system 100 includes an array of components: a central processing unit 102; a user interface 104, which typically consists of a keyboard, a mouse, and a monitor; a primary memory 106, such as a random access memory, for program execution; and a secondary memory 108, such as a disk, for storing programs and data that are not immediately needed for execution. A variety of hardware floating-point logics are shown, i.e., a multiplier 110, a divider 112, and a square root logic 114. Those skilled in the art will appreciate that these logical units could exist in alternative forms. For example, they could be integrated into a single device, such as the CPU 102, or produced via software, as shown, 116, 118, 120.

Contained within memories 106, 108 are an operating system 110 that contains instructions and data for managing the computer's resources and a testing device 122 containing logic that implements aspects of a preferred embodiment of the present invention. Here, the device 122 is illustrated as a software program. Those skilled in the art will realize, however, that the testing device could be implemented other technologies, such as hardware. As illustrated, the testing device 122 contains a multiplication/division testing component 124 and a square root testing component 124. The system also contains an adder 128 and a multiplier that is known to be accurate 130. The testing device 124 uses these items 128, 130 to test the accuracy of the floating-point logics 110, 112, 114, 116, 118, 120. The adder 128 is used for addition and subtraction operations, while the multiplier 130 is used to multiply by powers of two and small integers, such as three and nine.

Figure 2:
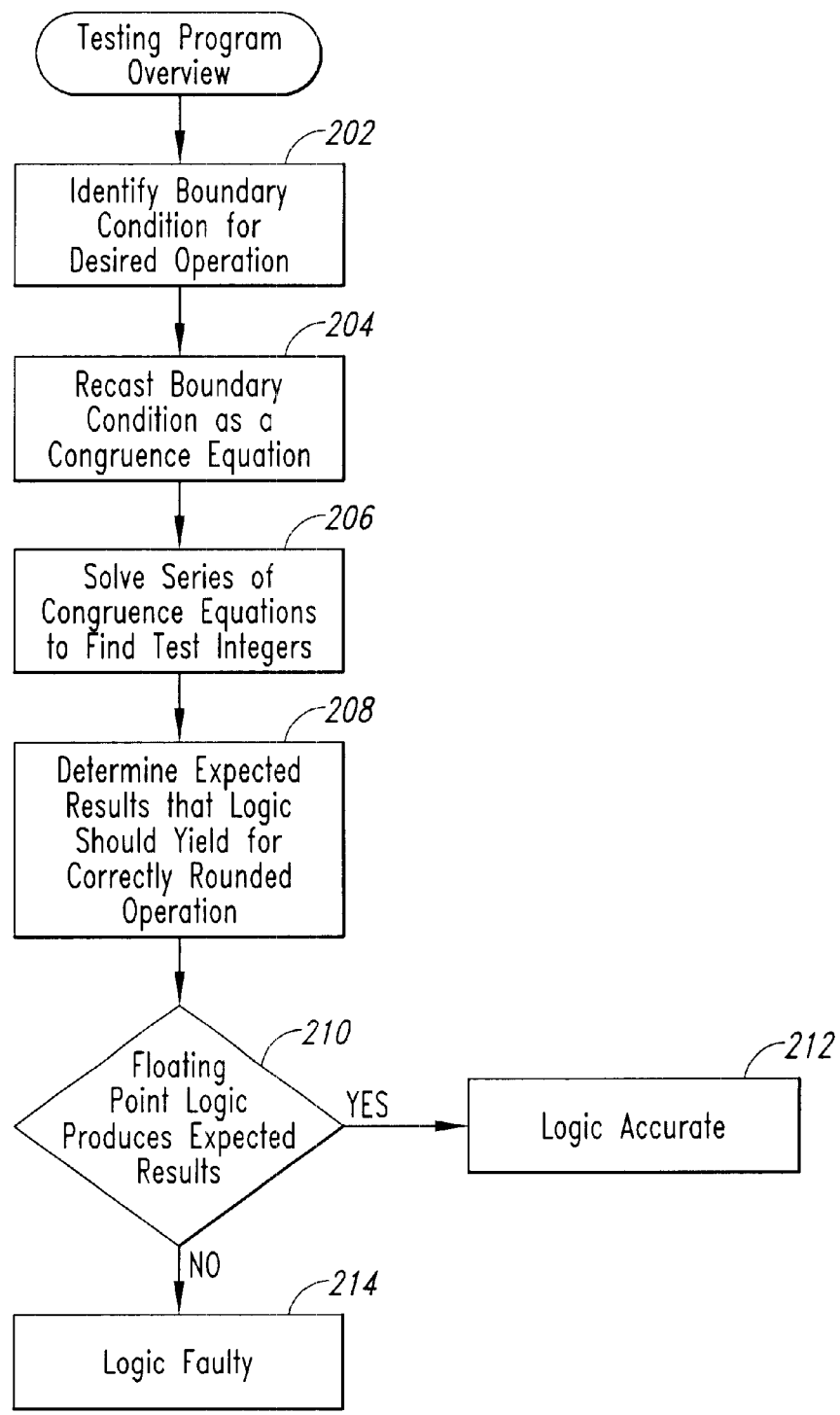
FIG. 2 illustrates an overview of processing steps for testing floating point logic in an embodiment of the present invention.

FIG. 2: Testing Program Overview

An overview for testing-floating point logic in an embodiment of the present invention is illustrated in FIG. 2. A purpose of the preferred embodiment is to generate difficult test cases for multiplication, division, and square root operations for the directed rounding modes specified by IEEE Standard 754.

The first hurdle is to recognize what constitutes a difficult test case. The most difficult floating-point logic to test is that which is presumed or known to be reasonably correct, for then random testing of such devices is unlikely to uncover errors. Examples of such logic are those that employ iterative schemes, such as Newton's iteration or Goldschmidt's algorithm. This is so because such schemes typically compute a close approximation of the infinitely precise value before invoking a corrective step that modifies the least significant bit. Erroneous logic based on such a scheme is likely to fail whenever the mathematical result lies close to a rounding boundary.

The question then becomes, how can mathematical results that lie very close to rounding boundaries be determined? To answer this question it is necessary reexamine why rounding occurs. In a computer system, a value must be rounded whenever there are bits lying to the right of the binary point, which is defined by the precision of the computer system. Put another way, the significand must be rounded because there is no room to store all the digits necessary to represent the number with infinite precision. Hence the digits that trail the binary point must be discarded. Before this is done, these trailing digits [or bits], must be inspected to determine the result of rounding that number in a particular direction. This inspection reveals an interesting truth: when trailing digits are composed of a consecutive string of zeroes or ones, the number lies very close to a directed rounding boundary. The longer that string, the closer the number lies to such a boundary. Thus, the problem becomes how to determine test arguments x and y such that the function values xy, x/y, and square root of x (SQRT(x)) have several consecutive binary zeroes or ones beyond the least significant bit. The first step of identifying the boundary condition for the desired mathematical operation has thus been achieved (step 202).

The next obstacle is to devise a method that produces such test arguments from the identified boundary condition. This can be done by borrowing a technique used in number theory: This technique is a recurrence known as Hensel lifting and is not often used by the engineering community.

As is relevant here, Hensel lifting refers to a method to solve certain relations involving only integers. The technique uses the theory of congruence, which bears the following notation: a≡b mod c, which is read: "a is congruent to b modulus (or modulo) c"; c is called the "modulus of congruence." When a, b, and c are integers, the congruence is equivalent to the statement "a−b is divisible by c" or "there is an integer k for which a−b=kc." For example, 23≡9 (mod 7), since 23−9=14 and 14 is divisible by 7. Having introduced congruence theory, Hensel lifting can now be explained by theorem and proof.

THEOREM: Suppose f is a polynomial with integer coefficients, a is an integer such that $f(a) \equiv 0 \mod 2^{j-1}$, and f'(a) is odd. Then $f(a-f(a)) \equiv 0 \mod 2^j$.

PROOF: Put b=a−f(a), and consider $f(b)=\Sigma c_i b_i = \Sigma c_i(a-f(a))^i$, summed from 0 to N. Working modulo $2^j$, simplify $(a-f(a))^i$ to $a^i - ia^{i-1}f(a)$ since $f(a)^i \equiv 0 \mod 2^j$ for i>=2. Thus, $f(b)=(\Sigma c_i a^i$, summed from 0 to N$)-(\Sigma ic_i a^{i-1} f(a)$, summed from 1 to N$)=f(a)(1-f'(a))$ 0 mod $2^j$ because 1−f'(a) is even.

COROLLARY: If b=a−f(a), then $f(b \mod 2^j) \equiv 0 \mod 2^j$.

PROOF: For any positive integer j, $f(b \mod 2^j) \equiv f(b) \mod 2^j$.

The Hensel Theorem says that under mild conditions on f, any solution $a_{j-1}$ to the congruence $f(a) \equiv 0 \mod 2^{j-1}$ can be lifted to a solution $a_j$ of $f(a) \equiv 0 \mod 2^{j-1}$. Alternatively stated, if the last j−1 bits of $f(a_{j-1})$ are zeroes and $a_j = a_{j-1} - f(a_{j-1})$, then the last j bits of $f(a_j)$ also are zeroes, and in fact, by the Corollary, the last j bits of $a_j$ will do in place of $a_{j-1} - f(a_{j-1})$.

The relations provided by Hensel lifting are utilized by the preferred embodiment to locate the sought after test arguments. As will be explained in more detail below, the identified directed boundary conditions are recast in terms of a series of congruence equations (step 204). Recurrence techniques derived from Hensel lifting are then used to find a solution to this series of equations. From this solution, difficult test data are found (step 206). The test data is provided to the floating-point logic, which performs the mathematical operation under inspection using the test data, which results in a number that the logic must directly round.

Besides locating the test data, the embodiments also yield the correctly rounded results for the mathematical operations being inspected (step 208). To make them transparent, listed here are explicit formulas for the directed rounding modes prescribed by IEEE Standard 754 using floor and ceiling functions. These functions apply to a normalized range, which refers to the area in which the exponent lies. This area is defined by two integers, $E_{min}$ and $E_{max}$, which are specified exactly in IEEE standard 754. In single precision, $E_{min}$=−126 and $E_{max}$=127. In double precision, $E_{min}$=−1022 and $E_{max}$=1023. For positive x in the normalized range, the rounding functions truncate, round-towards-negative, or minus, infinity, and round-towards-positive infinity are:

$$trunc(x)=2^{e(x)-n+1}\lfloor 2^{n-1-e(x)}x \rfloor$$

$$minf(x)=2^{e(x)-n+1}\lfloor 2^{n-1-e(x)}x \rfloor$$

$$inf(x)=2^{e(x)-n+1}\lceil 2^{n-1-e(x)}x \rceil.$$

where n refers to the system's precision, and $e(x)=\lfloor \log_2(x) \rfloor$ is the exponent of x. Positive arguments are explicitly discussed below. Negative arguments are implicitly disclosed here, as they follow from the symmetry relations:

$$trunc(-x)=-trunc(x)$$

$$minf(-x)=-inf(x).$$

And, as truncate and to-minus-infinity are identical under the above-constraints, the former needs no further mention.

The correctly rounded results are then compared with the directed-rounding results produced by the logic (step 210). If these results are the same, the logic has accurately rounded the data (step 212). If different, the logic is faulty (step 214). By conducting many such comparisons, embodiments of the invention quickly confirm or dispel the value of the logic's design.

Before proceeding with a more detailed description, note that the test arguments are scaled to locate all target products, quotients, and square roots inside one or two binades, since checks near the edges of the exponent range can be deduced from the scaling properties:

$$minf(2^m x)=2^m minf(x)$$

$$inf(2^m x)=2^m inf(x).$$

Also, and as will be explained in more detail below, note that the preferred embodiments are tailored to preclude overflow, underflow, and denormalized numbers. This is accomplished by pre-arranging all target products, quotients, and square roots under inspection to lie in a just a few given binades.

Further, the testing process has been designed not to introduce any rounding errors in the intermediate terms. This ensures that the testing process cannot corrupt itself. That is, because every significant mathematical operation in the test generation process is exact, only the operations under scrutiny are rounded.

Figure 3:
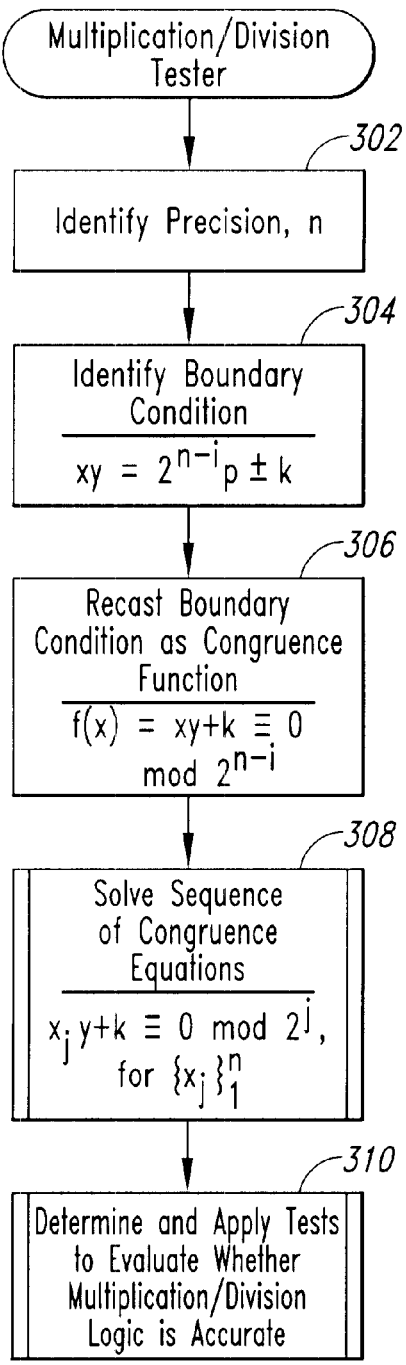
FIG. 3 illustrates processing steps used in a preferred embodiment to produce test cases for multiplication and division operations.

FIG. 3: Multiplication/Division Testing

An overview of the processing steps for deriving test cases for multiplication operations is illustrated in FIG. 3.

The figure is denoted a multiplication/division tester, because as will be explained in detail below, deriving test cases for multiplication always yields division test cases with minimal processing. See FIGS. 6, 7, 8, 9, In fact, deriving multiplication cases sometimes yields "free cases" for square root testing as well. See FIGS. 10 & 11. These characteristics of the preferred embodiments are highly advantageous, as they allow many test cases to be found in a relatively short amount of time. In fact, the production of data has proven to be linear, that is, on the order of n.

The process begins with by identifying the precision of the system (step 302). The next task is to identify the appropriate rounding boundary (step 304). Since multiplication is being considered, n-bit integers x and y in the range of $[2^{n-1}+1, 2^n-1]$ whose product is as close to a directed rounding boundary are sought. For such as case, $e(xy)=2n-2$ or $2n-1$. Hence, the product can be written as:

$$xy=2^{n-i}p \pm k$$

where i=0 or 1, k is small integer, and p is an n-bit number. By requiring k to be an integer other than zero, the product xy must by definition lie near a directed rounding boundary. The smaller the k, the closer the product is to that boundary. Thus, the boundary condition has been expressed in terms of an integer equation, which is then recast congruence function:

$$f(x)=xy \pm k \equiv 0 \bmod 2^{n-i} \text{ (step 306)}$$

Next, the embodiment solves, the following series of congruence equations for $x_j$:

$$xy \pm k \equiv 0 \bmod 2^j,$$

where j=1 to n (step 308). The solution to this series yields the test integers. This process is described in detail with reference to FIG. 5. Once the test integers are found, the logic computes a rounded xy product that is compared with the correctly product (step 310). In this manner, the embodiment determines if the logic is accurate. This process is explained in detail, beginning with FIG. 6.

Figure 4:
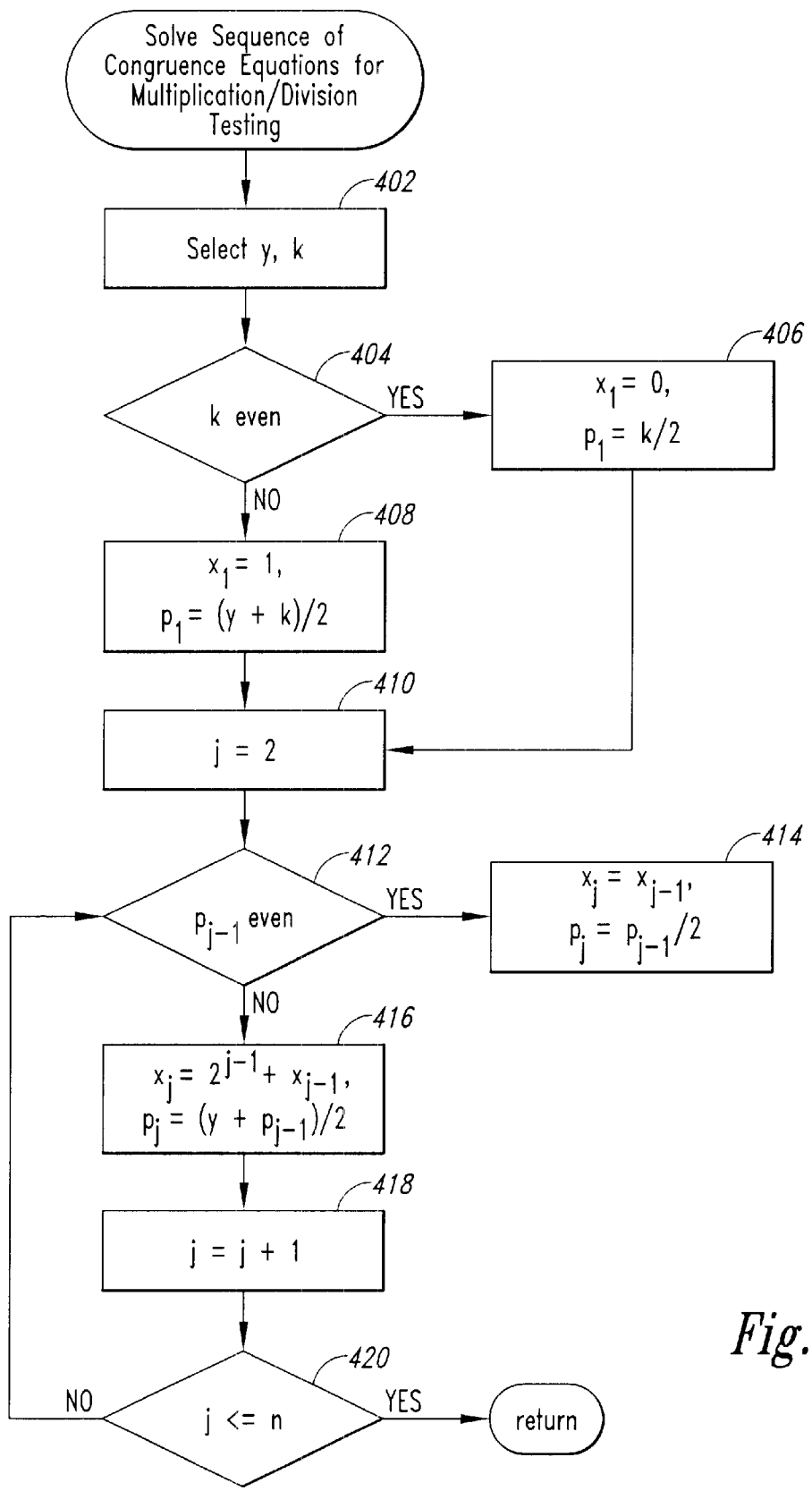
FIG. 4 illustrates the processing steps used in an embodiment of the invention to solve a sequence of congruence equations when testing directed roundings at boundaries produced by multiplication operations.

FIG. 4: Solving the Multiplication Congruence

The processing steps used in an embodiment of the invention to solve a sequence of congruence equations when testing directed rounding boundaries produced by multiplication operations is illustrated in FIG. 4. The process begins by selecting a y and a k (step 402). In a preferred embodiment, y is in the range of $[2^{n-1}+1, 2^n-1]$. Similarly in the preferred embodiment, k is small relative to $2^{n-1}$, e.g., in the range of [1, 1000]. An odd y and the minus sign will be considered first, with solutions for an even y and the plus sign being explained subsequently. Hence, the congruence function under consideration is:

$$f(x)=xy+k \equiv 0 \bmod 2^{n-i}$$

The series of congruence equations is:

$$x_j y+k \equiv 0 \bmod 2^j, \text{ for } j=1, \ldots, n$$

To solve the first congruence: set $x_1=0$ and $p_1=k/2$, if k is even, or set $x_1=1$ and $p_1=(y+k)/2$ if k is odd (steps 404, 406, 408). Proceed by mathematical induction to solve for the remaining j: Given $f(x_{j-1})=x_{j-1}y+k \equiv 0 \bmod 2^{j-1}$, define the integer $p_{j-1}$ by $x_{j-1}y+k=2^{j-1}p_{j-1}$. Since $f'(x_{j-1})=y$ is odd, the Hensel Theorem and Corollary provide that $f(x_j)=x_j y+k \equiv 0 \bmod 2^j$, where $$x_j = (x_{j-1} - f(x_{j-1})) \bmod 2^j$$

$$= (x_{j-1} - 2^{j-1} p_{j-1}) \bmod 2^j$$

$$= (x_{j-1} + 2^{j-1} p_{j-1}) \bmod 2^j$$

$$= x_{j-1} \quad \text{if } p_{j-1} \text{ is even}$$

$$= x_{j-1} + 2^{j-1} \quad \text{if } p_{j-1} \text{ is odd}$$

(Add $2^{j-1}p_{j-1}$ to the second equation to get the third). It has been established that $$x_j y+k=2^j p_j$$

for an integer $p_j$, and so by construction, every solution pair $(x_{j-1}, p_{j-1})$ provides a successor, building $x_{n-1}, x_n$ one bit at a time from right to left. Thus, given an odd y in $[2^{n-1}+1, 2^n-1]$, and small k greater than zero, the full algorithm is:
If k is even (step 404)
    set $x_1=0$ and $p_1=k/2$ (step 406)
If k is odd (step 404)
    set $x_1=1$ and $p_1=(y+k)/2$ (step 408)
For j=2, . . . , n (steps 410, 418, 420)
    If $p_{j-1}$ is even (step 412)
        set $x_j=x_{j-1}$ and $p_j=p_{j-1}/2$ (step 414)
    else set $x_j=2^{j-1}+x_{j-1}$ and $p_j=(y+p_{j-1})/2$ (step 416)
It is useful to bound the terms:

$$x_j <= 2^{j-1}-1 \text{ and } 1<=p_j<=y-1$$

PROOFS: Since $x_1<=1$ and $x_j<=2^{j-1}+x_{j-1}$, the first claim holds by the principle of mathematical induction. The lower bound for $p_j$ is apparent, and the upper bound is also proved by induction, viz: $p_1$ is either k/2 or (y+k)/2, so $p_1<=(y+k)/2<=y-1$ because k is a small integer. Given $p_{j-1}<=y-1$, the recurrence ensures that $p_j<=(y+p_{j-1})/2<=y-1/2$, which can be sharpened to $p_j<=y-1$, since $p_j$ and y are integers, hence the second claim.

Also note that the possibility that $x_{n-1}=0$ can be eliminated since it implies that k is an integer multiple of $2^{n-1}$, which violates the assumption that k is small relative to $2^{n-1}$ and does not correspond to any rounding boundary case.

Figure 5A:
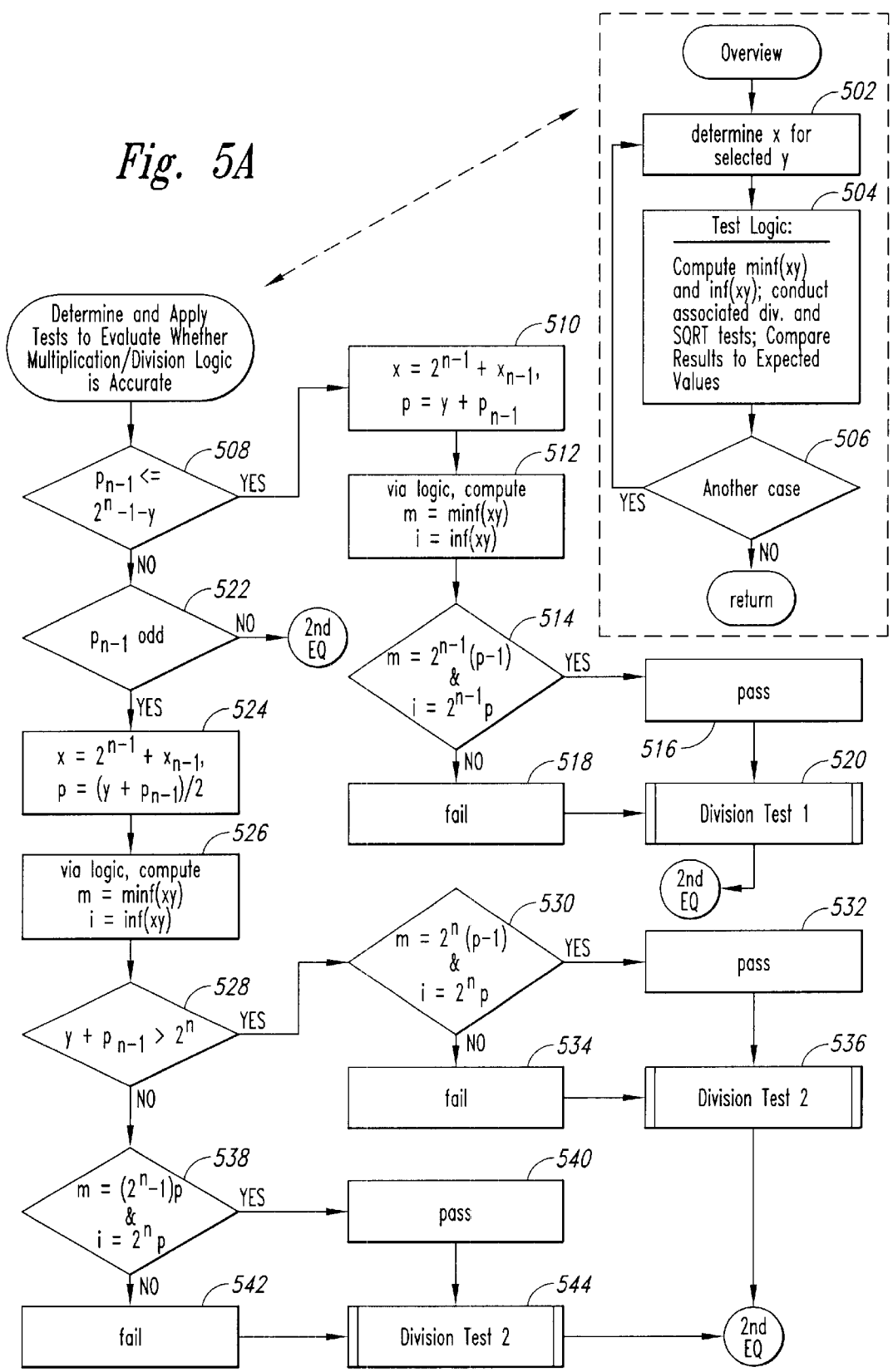
FIGS. 5A and 5B depict the processing steps used in a preferred embodiment to determine and apply test cases derived for multiplication and division operations.
Figure 5B:
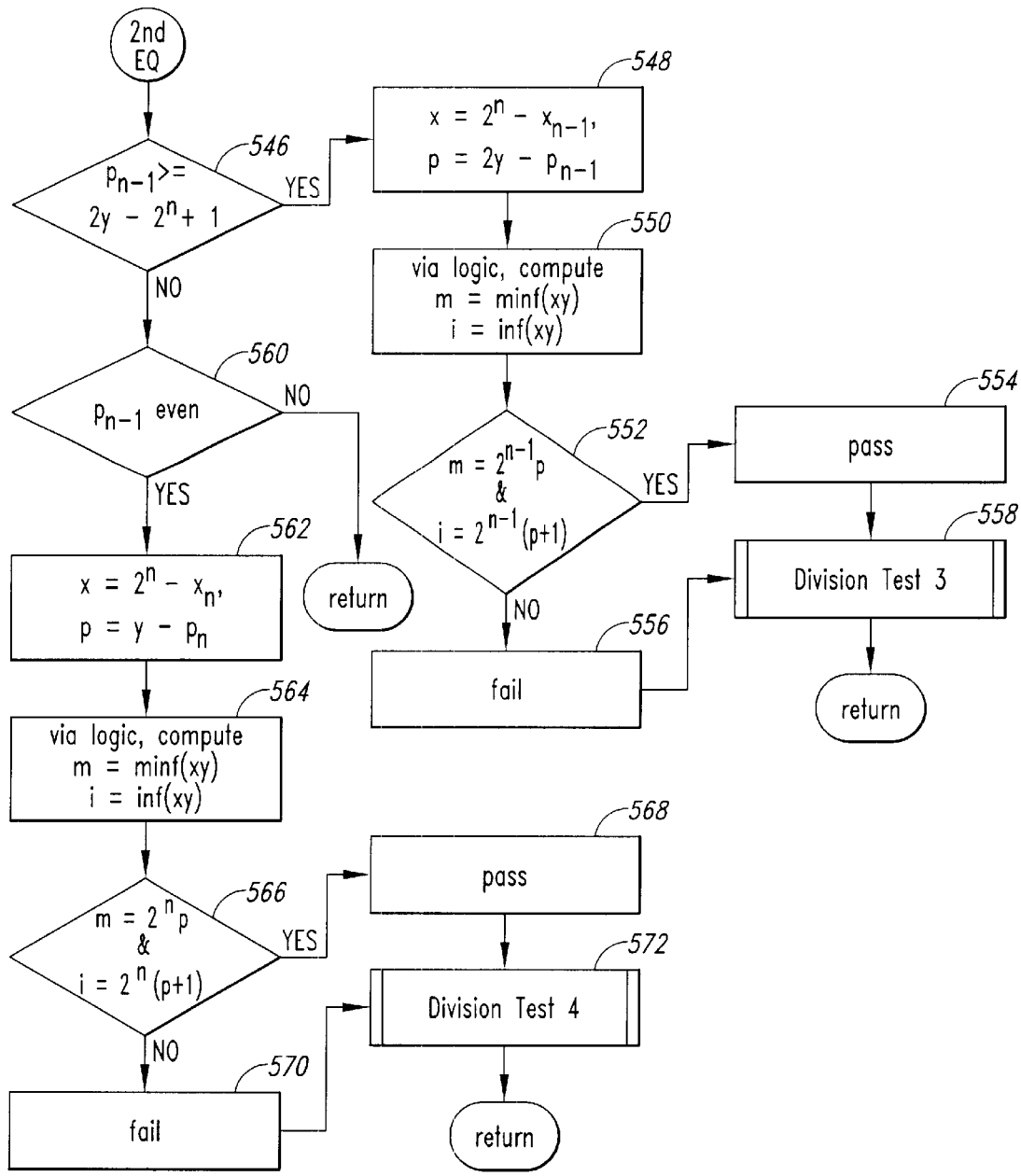
Figure 6:
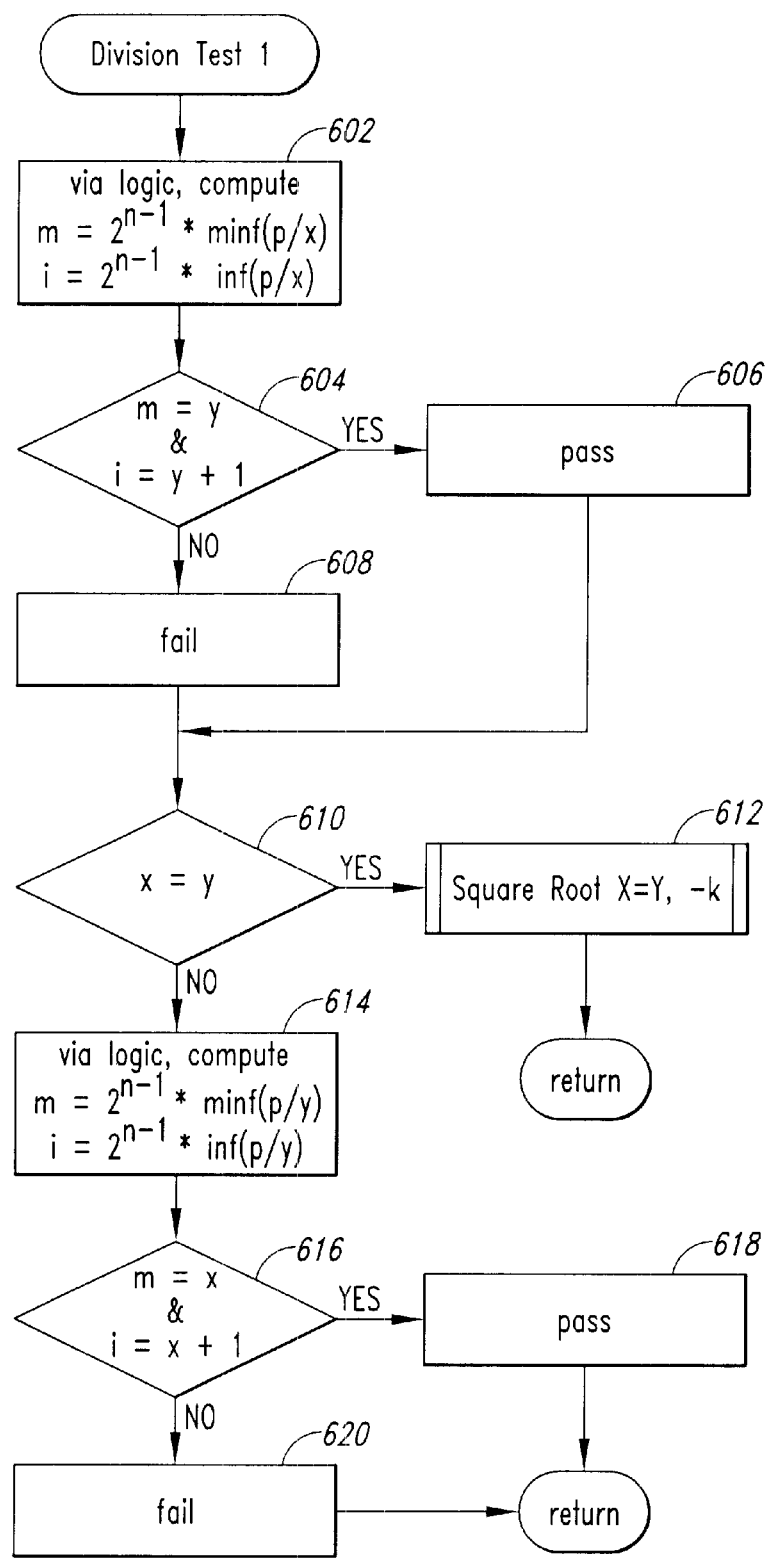
Figure 7:
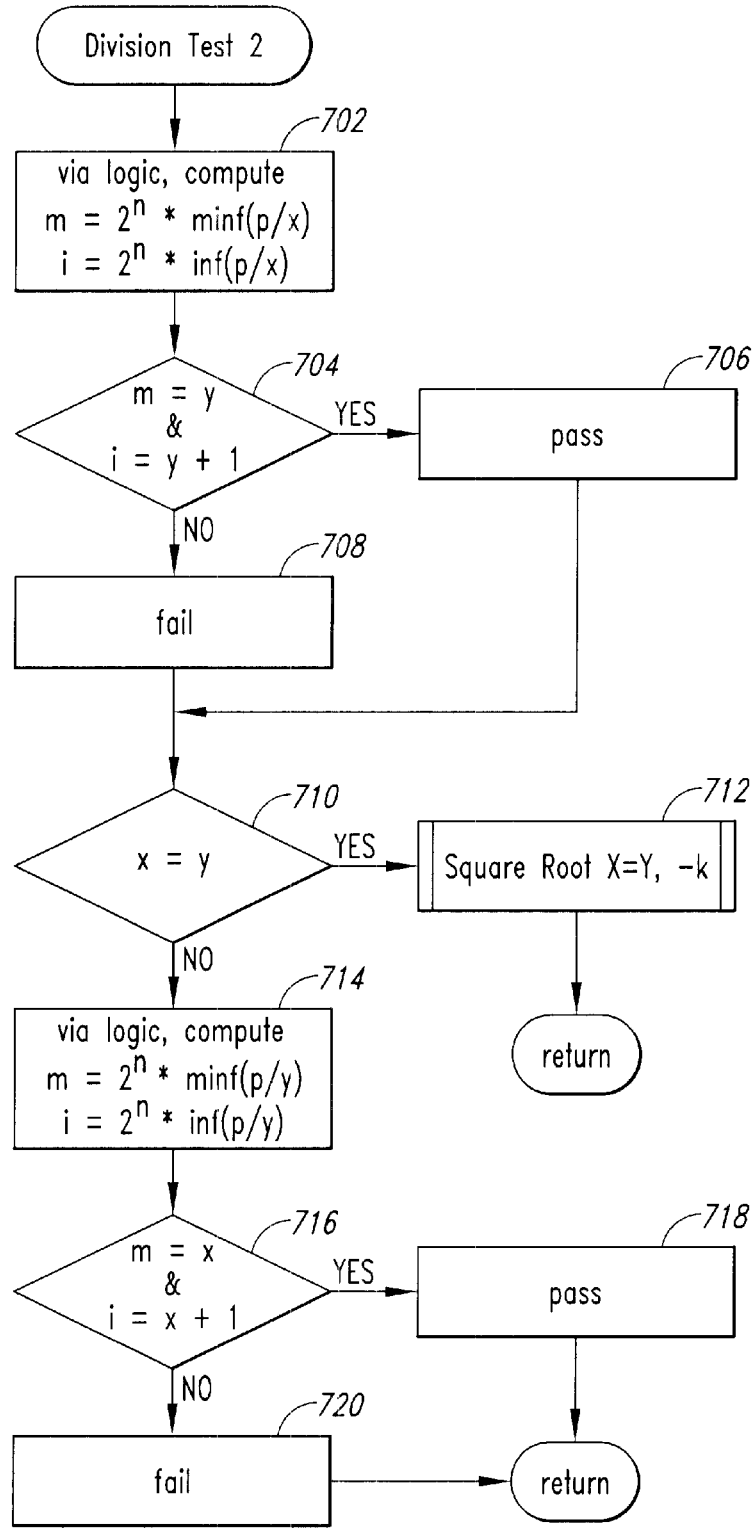
Figure 8:
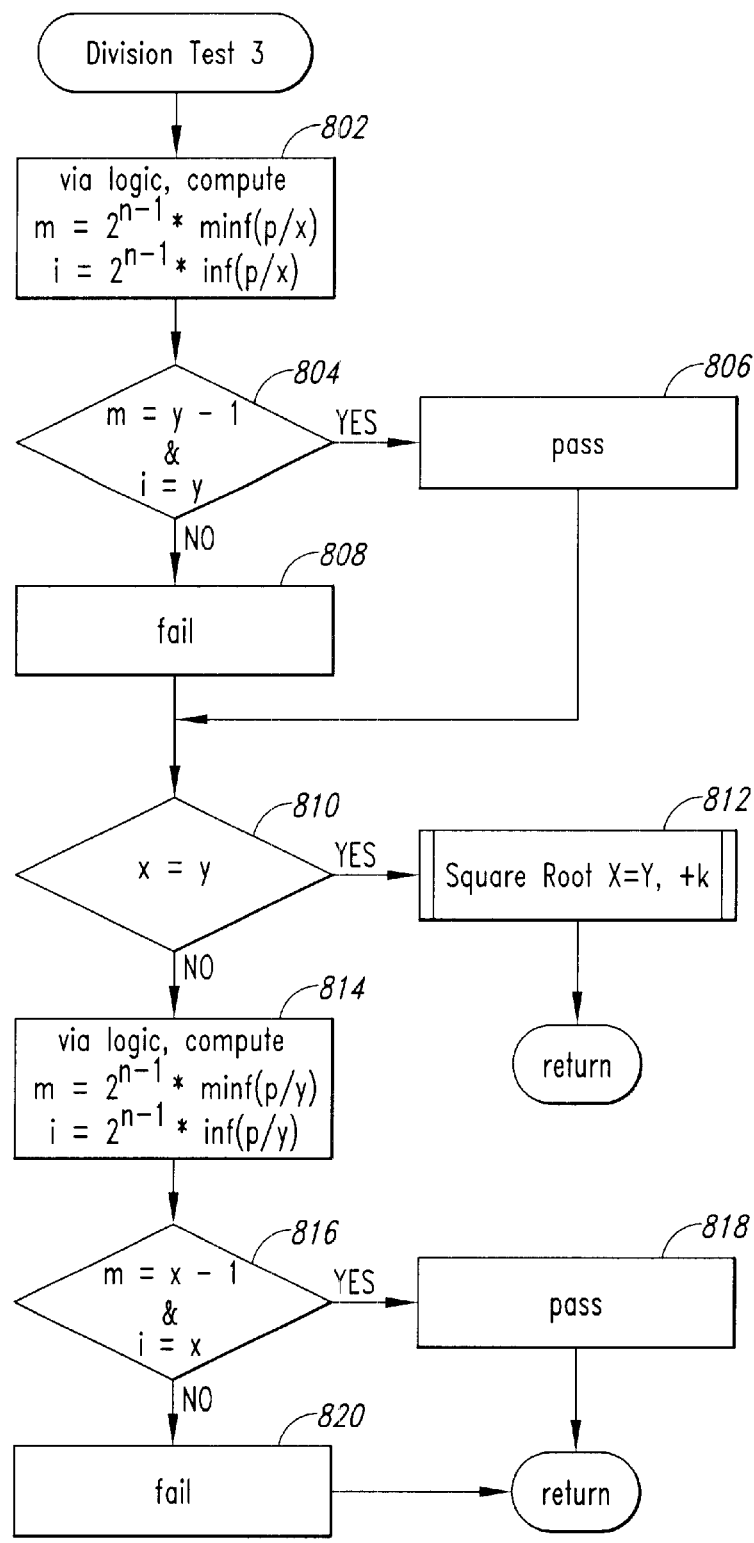
Figure 9:
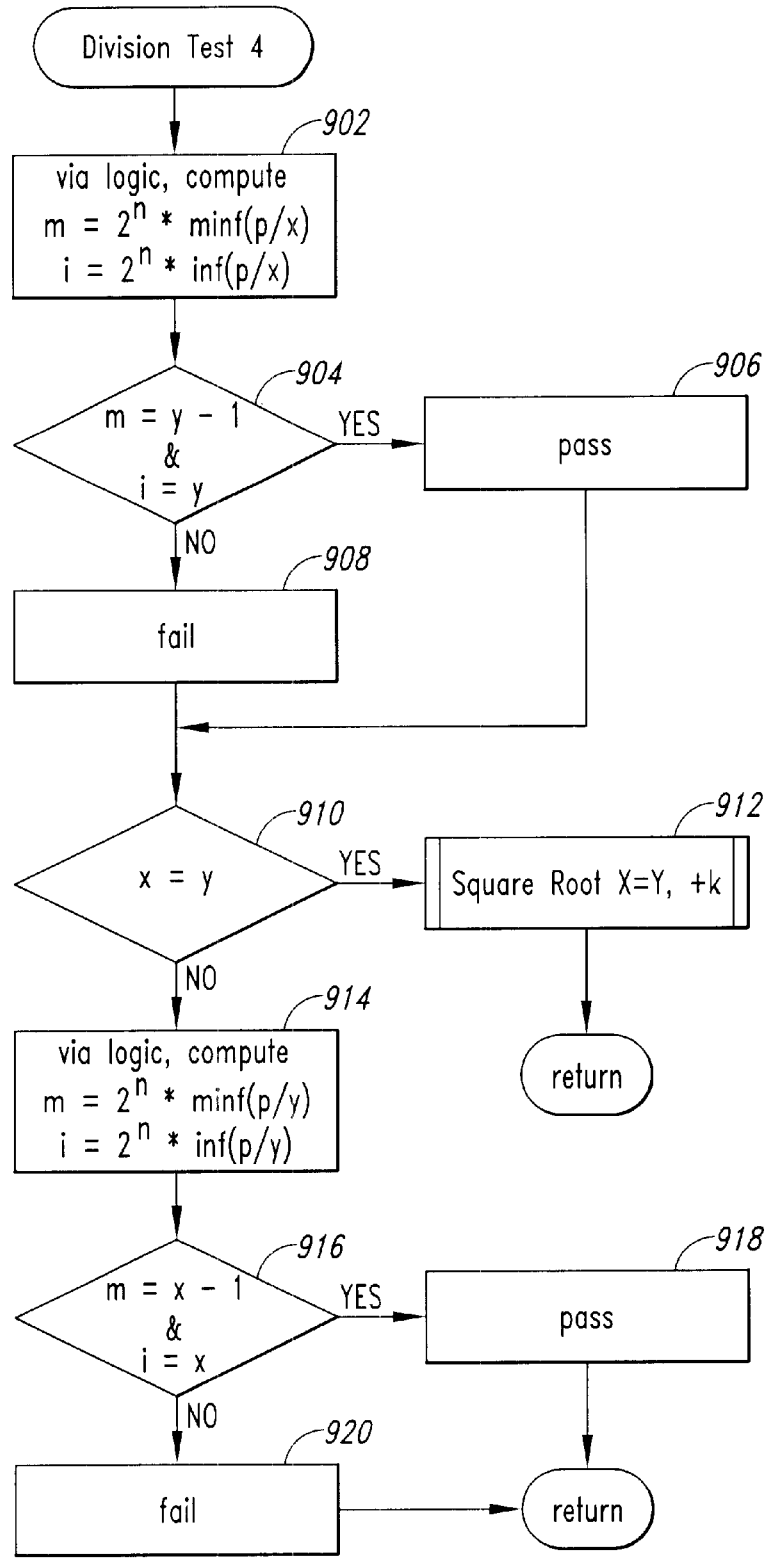

FIGS. 5A & 5B: Determining and Applying Test Cases for Multiplication/Division The processing steps used in an embodiment of the invention to solve to determine and apply test cases derived for multiplication and division operations are illustrated in FIGS. 5A and 5B. In brief, the embodiments determine an x for a selected y that satisfies the equation $xy=2^{n-i}p \pm k$, which represents a directed rounding boundary (step 502). This x, in conjunction with its corresponding p, is then used to test the logic. Not only are directed roundings for products tested, but for quotients and square roots as well, as such test data is derived from the production of the multiplication test data (step 504). This process completes until all test data x have been examined (step 506). The process will now be described in greater detail.

To find test data, an x and y must be inferred from $x_{n-1}$, $x_n$, $p_{n-1}$, $p_n$, such that $xy=2^{n-i}p \pm k$. Armed with $x_{n-1}y+k=2^{n-1}p_{n-1}$ and bounds $1<=x_{n-1}<=2^{n-1}$ and $1<=p_{n-1}<=y-1$, two derived equations $$(2^{n-1}+x_{n-1})y = 2^{n-1}(y+p_{n-1})-k$$

$$(2^n-x_{n-1})y = 2^{n-1}(2y-p_{n-1})+k$$

provide five situations such that $xy=2^{n-i}p \pm k$. As an optimization, any such solution for which p does not fit into n bits is discarded in the preferred embodiments.

The preferred embodiment begins by examining the first equation. If $p_{n-1}<=2^n1-y$, then both $x=2^{n-1}+x_{n-1}$ and $p=y+p_{n-1}$ are n-bit integers since $2^{n-1}<=x<=2^n-1$ and the same for p. (Note that $2^n-1-y$ is computed exactly since $y>=2^{n-1}+1$). Thus, this x and p represent a test case (steps 508, 510). And since $xy=2^{n-1}p-k$, one pair of directed multiplication tests for corrected rounded results is:

$$\min f(xy)=2^{n-1}(p-1),\ \inf(xy)=2^{n-1}p$$

The logic then computes xy and rounds this result in each direction (step 512). The preferred embodiment next compares the rounded results with the expected values: when they equal, the logic has passed, else it has failed (512, 514, 516, 518). Once this has been done, a preferred embodiment continues processing by examining relating division tests before returning to the multiplication testing, namely an examination of the second derived equations (step 520, FIGS. 5B and 6). These steps will be explained in more detail below.

On the other hand, if $p_{n-1}>=2^n-y$, then there are no worthwhile cases to pursue if $p_{n-1}$ is even, for then $y+p_{n-1}$ is odd and exceeds $2^n$. Hence, n+1 bits are needed to represent it. When the preferred embodiment encounters this case it continues with processing of the second equation, which is explained below relative to FIG. 5B (step 522, no branch).

As long as $p_{n-1}$ is odd, the next case to pursue is $x=2^{n-1}+x_{n-1}$ and $p=(y+p_{n-1})/2$ (step 524). (Note that p is immune from roundoff error because $2^n+2<=y+p_{n-1}<=2y-1<=2^{n+1}-2$. Similar remarks apply henceforth). A preferred embodiment next computes rounded products using these values (step 526). The correctly rounded results are dependent on the value of $y+p_{n-1}$. If this value exceeds $2^n$, correctly rounded results are identified by:

$$\min f(xy)=2^n(p-1),\ \inf(xy)=2^n p$$

Using these expected values, the preferred embodiment tests the logic in a manner analogous to that described above (steps 528, 530, 532, 534, 536).

If $y+p_{n-1}=2^n$, correctly rounded results are identified by:

$$\min f(xy)=(2^n-1)p,\ \inf(xy)=2^n p$$

This case occurs when xy barely undercuts a power of two. Again, the preferred embodiment tests the logic in a manner analogous to that described above with reference to the first test case (steps 538, 540, 542, 544).

The analysis of the second derived equation $$(2^n-x_{n-1})y=2^{n-1}(2y-p_{n-1})+k$$

is similar to the first, and is set forth in FIG. 5B. The process begins by examining whether $p_{n-1}>=2y-2^n+1$ (step 546). From the bounds on $x_{n-1}$ and $p_{n-1}$, both $x=2^n-x_{n-1}$ and $p=2y-p_{n-1}$ are n-bit integers in the range $[2^{n-1}+1, 2^n-1]$, and since $xy=2^{n-1}p+k$, the tests are:

$$\min f(xy)=2^{n-1}p,\ \inf(xy)=2^{n-1}(p+1)$$

The preferred embodiment again tests the logic in the manner explained previously (steps 548, 550, 552, 554, 556, 558).

The embodiment continues by examining cases where $p_{n-1}<2y-2^n+1$ (step 546, no branch). Here, when $p_{n-1}$ is odd, there are no worthwhile cases to pursue, for then $2y-p_{n-1}$ is odd and exceeds $2^n$, and so does not fit into n-bits. Under these circumstances, multiplication testing is complete for this y and k (step 560, no branch). When $p_{n-1}$ is even and at most $2y-2^n$, however, there is a valid test case: $x=2^n-x_n$ and $p=y-p_n$. The corresponding tests are:

$$\min f(xy)=2^n p,\ \inf(xy)=2^n(p+1)$$

Again, the preferred embodiment tests the logic using for this case in the manner previously explained (steps 562, 564, 566, 568, 570, 572).

Note that the smaller the y is, the more likely are $y+p_{n-1}.<=2^n-1$ and $2y-p_{n-1}.<=2^n-1$, whereas the conditions $y+p_{n-1}.>=2^n$ and $2y\ p_{n-1}>=2^n$ are more likely to apply if y lies closer to $2^n-1$ than $2^{n-1}$.

The preceding test derivation can be generalized neatly to produce test cases if y is an even integer in the range of $[2^{n-1}+2, 2^n-2]$. Set $y=2^ty'$ where t is the greatest power of two that divides y. Thus, y' must be odd. Select an integer $k=2^tk'$ where k' is an integer and solve $$xy'+k'=2^{n-i-t}p$$

by computing solutions to $$x_jy'+k=2^jp_j$$

using the full algorithm up to step n–t, but first replace its k by k' and y by y'. With $x_{n-1-t}$, $x_{n-t}$, $p_{n-1-t}$, and $p_{n-t}$, consider the equations $$(2^{n-1}+x_{n-1-t})y=2^{n-1}(y+p_{n-1-t})-k$$

$$(2^n-x_{n-1-t})y=2^{n-1}(2y-p_{n-1-t})+k$$

Analogous to the case where y is odd, there are five situations worth investigating. To distinguish them, the admissibility criteria for odd y must be slightly recast, but the statements for verification are notationally unchanged and so are not repeated.

For the first derived equation if $p_{n-1-t}<=2^n-1-y$, then set $x=2^{n-1}+x_{n-1-t}$ and $p=y+p_{n-1-t}$ so that $xy=2^{n-1}p-k$. Next if $y+p_{n-1-t}>=2^n$ and $p_{n-1-t}$ and y have the same parity, set $x=2^{n-1}+x_{n-1-t}$ and $p=(y+p_{n-1-t})/2$ so that $xy=2^np-k$.

For the second derived equation if $p_{n-1-t}<=2y-2^n+1$, then set $x=2^n-x_{n-1-t}$ and $p=2y-p_{n-1-t}$ so that $xy=2^{n-1}p+k$. Last, if $p_{n-1-t}$ is even, set $x=2^n-x_{n-t}$ and $p=y-p_{n-t}$ so that $xy=2^np+k$.

The preceding paragraphs actually generalize the case where y is odd, for then t=0. And since it is plausible to test IEEE single precision exhaustively in a are reasonable amount of time, a preferred embodiment may require $x>=y$.

Examples are shown in Table 1, using decimal form atop the conventional hexadecimal format, with an underscore character for the binary point.

TABLE 1

Boundary Cases for Multiplication

| x | y | $2^{n-1}xy$ |
|---|---|---|
| 8388609 | 8388609 | $2^{23}$ × 8388610.0000001... |
| 4b000001 | 4b000001 | 56800002_000002... |
| 16777213 | 8388609 | $2^{23}$ × 16777214.9999996... |
| 4b7fffd | 4b000001 | 56ffffe_ffffa... |
| 8388611 | 8388609 | $2^{23}$ × 8388612.0000003... |
| 4b000003 | 4b000001 | 56800004_000006... |
| 12582911 | 8388610 | $2^{23}$ × 12582913.9999997... |
| 4b3fffff | 4b000002 | 56c00001_ffffc... |
| 12582914 | 8388610 | $2^{23}$ × 12582917.0000004... |
| 4b400002 | 4b000002 | 56c00005_000008... |
| 13981013 | 8388611 | $2^{23}$ × 13981017.9999998... |

TABLE 1-continued

Boundary Cases for Multiplication

| x | y | $2^{n-1}xy$ |
|---|---|---|
| 4b555555 | 4b000003 | 56d55559_fffffe... |
| 11184811 | 8388611 | $2^{23}$ × 11184815.0000001... |
| 4b2aaaab | 4b000003 | 56aaaaaf_000002... |
| 11184810 | 8388611 | $2^{23}$ × 11184813.9999997... |
| 4b2aaaaa | 4b000003 | 56aaaaad_fffffc... |
| 13981014 | 8388611 | $2^{23}$ × 13981019.0000002... |
| 4b555556 | 4b000003 | 56d5555b_000004... |

FIGS. 6–9: Division Testing

The processing steps used by embodiments of the invention to test whether a logic is producing correct directly rounded quotients are set forth in FIGS. 6, 7, 8, 9. Respectively, these figures illustrate the routines called while the preferred embodiment was conducting multiplication testing (see 520, 536, 544, 558, and 572). By linking the multiplication with the division testing in this fashion, the division testing is accomplished at negligible processing cost, for each valid pair of multiplication operands provides at least one, and usually two, directed division tests. And when only one division test is provided, the multiplication operands provide one directed square root test. The processing steps set forth in FIGS. 6, 7, 8, and 9 are logically similar. For this reason, the derivation of all the tests will first be described without reference to any figure. Once the derivation is explained, the figures will be referenced collectively.

To find multiplication operands, the preferred embodiment solved $xy=2^{n-i}p\pm k$. This relationship can be recast as $$(2^{n-i}p)/x=y\pm\epsilon_x \text{ and } (2^{n-i}p)/y=x\pm\epsilon_y$$

for tiny $\epsilon_x=k/x$ and $\epsilon_y=k/y$. If $xy=2^{n-i}p-k$, is a test for directed multiplication, the corresponding tests for directed division are:

$$2^{n-i}\text{minf}(p/x)=y, \ 2^{n-i}\text{inf}(p/x)=y+1$$

$$2^{n-i}\text{minf}(p/y)=x, \ 2^{n-i}\text{inf}(p/y)=x+1$$

If $xy=2^{n-i}p+k$, the tests the corresponding tests for directed division are:

$$2^{n-i}\text{minf}(p/x)=y-1, \ 2^{n-i}\text{inf}(p/x)=y$$

$$2^{n-i}\text{minf}(p/y)=x-1, \ 2^{n-i}\text{inf}(p/y)=x$$

Having described the tests for minus and positive k, the processing of a preferred embodiment will know be described with reference to FIGS. 6, 7, 8, and 9. The logic computes its directed rounded quotients for p/x using the determined operands (steps 602, 702, 802, 902), which are then compared to the above-identified expected values, (steps 604, 704, 804, 904). When these values match, the logic passes, (steps 606, 706, 806, 906), else the logic fails, (steps 608, 708, 808, 908). Next, the preferred embodiment determines if x=y, for if it does, p/x=p/y and there is therefore no need to independently check the rounding of the p/y quotient (steps 610, 710, 810, 910). If x=y, however, the preferred embodiment conducts a directed square root test, which will be explained below in reference to FIGS. 10 and 11 (steps 612, 712, 812, 912). If x does not equal y, processing continues by testing the quotient p/y in a manner analogous to that explained for p/x (steps: 614, 616, 618, 620; 714, 716, 718, 720; 814, 816, 818, 820; 914, 916, 918, 920). When this is done, the division testing process returns to the multiplication testing process.

The examples shown in Table 2 correspond to various rows of Table 1. Each has at least 21 consecutive like bits after the binary point; the first has 23 ones. These test data are far more likely to uncover a defective iterative division algorithm than random tests, and for very wide precisions, no practical amount of random testing will stumble on these patterns.

TABLE 2

Boundary Cases for Division

| $2^{n-1}p$ | x | $2^{n-1}p/x$ |
|---|---|---|
| $2^{23}$ × 8388610 | 8388609 | 8388608.9999998... |
| 56800002 | 4b000001 | 4b000000_fffffe... |
| $2^{23}$ × 16777215 | 16777213 | 8388609.0000001... |
| 56ffffff | 4b7ffffd | 4b000001_000003... |
| $2^{23}$ × 8388612 | 8388611 | 8388608.9999996... |
| 56800004 | 4b000003 | 4b000000_fffffa... |
| $2^{23}$ × 12582914 | 12582911 | 8388610.0000001... |
| 56c00002 | 4b3fffff | 4b000002_000002... |
| 12582913 | 12582910 | 8388610.0000003... |
| 4b400001 | 4b3ffffe | 4b000002_000005... |

| $2^{n-1}p$ | y | $2^{n-1}p/y$ |
|---|---|---|
| $2^{23}$ × 16777215 | 8388609 | 16777213.0000003... |
| 56ffffff | 4b000001 | 4b7ffff_000005... |
| $2^{23}$ × 8388612 | 8388609 | 8388610.9999996... |
| 56800004 | 4b000001 | 4b000002_fffffa... |
| $2^{23}$ × 12582914 | 8388610 | 12582911.0000002... |
| 56c00002 | 4b000002 | 4b3fffff_000003... |
| $2^{23}$ × 12582913 | 8388610 | 12582910.0000004... |
| 4b400001 | 4b000002 | 4b3ffffe_000007... |

FIGS. 10–11: Special Square Root Testing

The processing steps used by a preferred embodiment of the present invention to conduct a directed square root test when equal multiplicands are found are set forth in FIGS. 10 and 11. Which routine is invoked is dependent on k's sign, as this dictates the correctly rounded result. Otherwise, the two Figures are logically similar. For that reason, after the process for developing the tests is disclosed, the figures are explained in unison.

The derivation of square root test cases for equal multiplicands depends on the indicated sign of k in $xy\pm k=2^{n-i}$ and whether the exponent n−i is even or odd. If the plus sign is used and n−i is even, say 2m, then $x^2+k=2^{2m}p$, and two square root tests are:

$$2^m\text{minf}(\text{SQRT}(p))=x, \ 2^m\text{inf}(\text{SQRT}(p))=x+1$$

But if n−i is odd, say 2m+1, then $x^2+k=2^{2m+1}p$. Certainly 2p is representable without rounding if p is, and so:

$$2^m\text{minf}(\text{SQRT}(2p))=x, \ 2^m\text{inf}(\text{SQRT}(2p))=x+1$$

Tests associated with the equation $x^2-k=2^{n-i}p$ are obtained in a similar manner. For an even exponent, check $$2^m\text{minf}(\text{SQRT}(p))=x-1, \ 2^m\text{inf}(\text{SQRT}(p))=x$$

and for an odd exponent, check $$2^m\text{minf}(\text{SQRT}(2p))=x-1, \ 2^m\text{inf}(\text{SQRT}(2p))=x$$

For example, from Table 1, we know that $8388609^2-1=2^{23}\times 8388610$, and so $2^{11}((SQRT(2\times 8388610))=8388608.99999994\ldots$ Another case is $16777215^2-1=2^{24}\times 16777214$, with $2^{12}((SQRT(16777214))=8388608.99999994\ldots$ This trick cannot be exploited to find division or square root boundary cases for mode-to-nearest, because for that problem xy (or $x^2$) must nearly equal the average of consecutive n-bit floating-point numbers, and exactly n+1 bits are required to represent that midpoint.

Referring to the figures, the process is as follows: the parity of the exponent n−i is determined (steps 1002, 1102); the logic computes the corresponding test integer's directed square root (steps: 1004,1104; 1006,1106), and the computed values are compared with the expected values to determine the accuracy of the logic (steps: 1008,1010,1012, 1014,1016,1018; 1108, 1110,1112, 1114, 1116, 1118). Once this is done, the processing returns the division testing processing of FIGS. 6, 7, 8, and 9, which in turn return to the multiplication processing of FIGS. 5A and 5B.

FIG. 12: Directed Square Root Testing

An overview of the processing steps for deriving test cases for square root testing is illustrated in FIG. 12. What is sought here is difficult test cases for directed rounding square root operations. It is thus necessary to determine a bit pattern that represents boundary conditions for such operations, i.e., numbers that cannot be represented within the machine's precision. The process begins then by identifying that precision (step 1202). Next, the boundary condition must be identified (step 1204). For this operation, a difficult test integer is one whose square root that lies just off a number that is exactly representable by n-bits. Hence, where $\epsilon$ is tiny and z is an n-bit integer, the desired relationship is expressible as $SQRT(x)=z\pm\epsilon$. Thus, $x=z^2-k$, for small integers k of either sign. This boundary condition is then recast as a congruence equation (step 1206). Since $e(x)=2n-2$ or $2n-1$ and x must be expressible using at most n bits, we must have $x\equiv 0 \bmod 2^{n-i}$, where i=0 or 1. Therefore $z^2\equiv k \bmod 2^{n-i}$ and the smaller $|k|$ is, the closer SQRT (x) is to a directed rounding boundary. Test integers are then obtained by finding a solution to the series of congruence functions defined as $z_j^2\equiv k \bmod 2^j$, for $j=1,\ldots,n$ Once this series is solved for z (step 1208), an x is calculated from the solved z and a correctly rounded square root for x is obtained. This expected value is then compared to a value produced by the logic (step 1210). If they match, the logic has correctly rounded the data. If not, the logic has a design flaw. This process will now be explained in greater detail.

FIG. 13: Solving the Square Root Recurrence

In a preferred embodiment of the invention, the recurrence $z_j^2\equiv k \bmod 2^j$, for $j=1,\ldots,n$ is solved using Hensel lifting and principles borrowed from "p-adic arithmetic." The first step is to select a k (step 1302). In the preferred embodiment test integers are selected by choosing k in { ..., −15, −7, 1, 9, 17, ... }. Next, Set $z_3=1$ and let $z_j^2-k=2^j R_j$ for $j=3,\ldots,n$, (steps 1304, 1306, 1314, 1316)

If $R_{j-1}$ is even, set $z_j=z_{j-1}$ and $R_j=R_{j-1}/2$ (steps 1308 1310, 1314, 1316)

else set $z_j=2^{j-2}-z_{j-1}$ and $R_j=2^{j-4}+(R_{j-1}-z_{j-1})/2$ (steps 1308, 1312, 1314, 1316)

For any $k\equiv 1 \bmod 8$, the congruence $z_j^2\equiv k \bmod 2^j$, has infinitely many positive solutions. If $z_j$ is the smallest, the four smallest solutions are $\{z_j, 2^{j-1}-z_j, 2^{j-1}+z_j, 2^j-z_j\}$ lying in the isometric ranges $[1, 2^{j-2}1], [2^{j-2}+1, 2^{j-1}-1],$ $[2^{j-1}+1, 3\times 2^{j-2}-1], [3\times 2^{j-2}+1, 2^j-1],$ respectively. For j=n−i, whichever solutions z satisfy $2^{2n-1-i}<=z^2-k<=2^{n-i}(2^n-1)$ provide difficult test integers $x=z^2-k$. Infer that the tests are $\minf(SQRT(x)) = z,\quad \inf(SQRT(x)) = z + 1,\quad \text{if } k < 0$ $\minf(SQRT(x)) = z - 1,\quad \inf(SQRT(x)) = z,\quad \text{if } k > 0$ The analysis of whether $x=z^2-k$ lies in an acceptable range spits into two cases. First, for i=1, use the recurrence to solve the congruence $z_{n-1}^2\equiv k \bmod 2^j$ to obtain four solutions $\{r_1, r_2, r_3, r_4\}=\{z_{n-1}, 2^{n-2}-z_{n-1}, 2^{n-2}+z_{n-1}, 2^{n-1}-z_{n-1}\}$ Unfortunately, no such solution , is large enough for x to lie in $[2^{2n-2}, 2^{n-1}(2^n-1)]$. The preferred embodiment, overcomes this obstacle: The following proofs shows that $s_1=2^{n-1}+r_1$ leads to a valid test integer, as does $s_2=2^{n-1}+r_2$, if it is smaller than $SQRT(2^{2n-1}-2^{n-1})$. Note that $s_1^2\equiv s_2^2\equiv k \bmod 2^{n-1}$, as required. The first proof relates to $z_2^2\equiv k \bmod 2^{n-1}$. The second proof relates to $z_2^2\equiv k \bmod 2^n$.

LEMMA: $s_1$ is admissible, and $s_2$ is admissible if $s_2<c_1=SQRT(2^{2n-1}-2^{n-1})$.

PROOFS: Assume that $0<\epsilon<1/2^5$ so that $|k|$ is $<=2^{n-4}$ and SQRT(x) has at least four consecutive zeroes or ones past the binary point. For all k of interest, $s_1^2-k>=(2^{n-1}+1)^2-2^{n-4}>2^{n-2}$, and $s_1<2^{n-1}+2^{n-3}$, so $s_1^2-k<(2^{n-1}+2^{n-3})^2+2^{n-4}<2^{n-1}(2^n-1)$. Since $s_2>s_1$, we have $s_2^2-k>2^{2n-2}$. We must also decide whether $s_2^2-k<=2^{2n-1}-2^{n-1}$, or equivalently, whether $s_2^2-2^{2n-1}+2^{n-1}<=k$. The parabola $k(r)=r^2-2^{2n-1}+2^{n-1}$ is extremely steep on the domain of those r for which $|k|<=2^{n-4}$, so steep that comparing $s_2$ to the positive zero of $c_1$ of $k(r)$ is enough to determine whether $s_2^2-k<=2^{n-1}(2^n-1)$.

If k is not too large, the solutions of the congruence can be checked quickly for validity. The same holds true for the second case, i=0, for which the recurrence is used to solve $z_n^2\equiv k \bmod 2^n$, for $\{r_1, r_2, r_3, r_4\}=\{z_n, 2^{n-1}-z_n, 2^{n-1}+z_n, 2^n-z_n\}$. The following proof demonstrates that $r_4$ is in $[2^{2n-1}, 2^n(2^n-1)]$, as is $r_3$, if larger than $2^{n-1/2}$.

LEMMA: $r_4$ is always admissible, and $r_3$ is admissible if $r_3>=c_0=2^{n-1/2}$.

PROOFS: For all k of interest, $r_4^2-k>=(3\times 2^{n-2}+1)^2-2^{n-4}>2^{n-1}$, and $r_4^2-k<=(2^{n-1})^2+2^{n-4}<2^n(2^n-1)$. Next, $r_3^2-k<r_4^2-k<2^n(2^n-1)$, so $r_3$ is never too large. It remains to determine whether $r_3^2-k>=(2^{2n-1})$, or equivalently, whether $k<=r_3^2-(2^{2n-1})$. But the r-coordinates of the intersection of the parabola $k(r)=r^2-2^{2n-1}$ with lines $k=\pm 2^{2n-4}$ hardly differ, so it suffices to compare $r_3$ to the zero $c_0$ of $k(r)$.

Thus, the recurrence always provides two integers, and possibly three. But no more than three is possible, as will now be shown referring $r_3$ and $r_4$ for the case of i=0.

THEOREM: No k produces four test integers.

PROOF: If $R_{n-1}$ is even, then $z_n = z_{n-1}$, so $r_3 = 2^{n-1} + z_n = 2^{n-1} + z_{n-1} = s_1$. Hence, $r_3^2 - k = s_1^2 - k <= 2^{n-1}(2^n - 1) < 2^{2n-1}$. Therefore $r_3$ is too small to produce a test integer. If $R_{n-1}$ is odd, then $z_n = 2^{n-2} - z_{n-1}$, so $r_3 = 2^{n-1} + 2^{n-2} - z_{n-1} = s_2$. If also $s_2$ is admissible, then $r_3^2 - k <= 2^{n-1}(2^n - 1) < 2^{2n-1}$.

Thus, either two or three integers are produced for each k. If distributed evenly within this range, solution $s_2$ would be valid about $(c_1 - 5 \times 2^{n-3})/2^{n-3} \approx 4(SQRT(2)) - 5 = 65.7\%$ percent of the time, and $r_3$ would be valid about $(3 \times 2^{n-2} - c_0)/2^{n-2} 3 - 2(SQRT(2)) = 17.2$ percent of the time. For odd k, the preferred embodiment corroborates these figures, averaging 2.828 integers per k when testing double precision. Thus, trial cases are economically produced.

Solutions and corresponding test integers are summarized below:

TABLE 3

Square Root Test Integer Calculations

| For Solution z... | Compute $x = x^2 - k$ via |
|---|---|
| $2^{n-1} + z_{n-1}$ | $2^{n-1}(2^{n-1} + (R_{n-1} + 2z_{n-1}))$ |
| $2^{n-1} + 2^{n-2} - z_{n-1}$ | $2^{n-1}(9 \times 2^{n-3} + (R_{n-1} - 3z_{n-1}))$ |
| $2^{n-1} + z_n$ | $2^n(2^{n-2} + (R_n + z_n))$ |
| $2^n - z_n$ | $2^n(2^n + (R_n - 2z_n))$ |

As with multiplication, there is a generalization to find more square root test cases if k is an even integer. If there are any test integers to find for event k, then the corresponding z must be even as well, and so k must be divisible by 4. Set $k = 4^t k'$ where t is the greatest power of four that divides k, and let $z = 2^t z'$. Both k' and z' are odd so $k' \equiv 1 \bmod 8$. To obtain trial cases, solve the congruences $z'_j{}^2 \equiv k' \bmod 2^{j-i-2t}$, using the lifting algorithm up to step $n-i-2t$, but first replace its $z_j$ by $z'_j$ and k by k'. Then set $z_{n-1} = 2^t z'_{n-1-2t}$ and $z_n = 2^t z'_{n-2t}$ to solve congruences $z^2 \equiv k \bmod 2^{n-i}$.

Admissible solutions for even k are $s_1 = 2^{n-1} + z_{n-1}$ and possibly $s_2 = 2^{n-1} + 2^{n-2} - z_{n-1}$ (for i=1), along with $r_4 = 2^n - z_n$ and possibly $r_3 = 2^{n-1} - z_n$ (for i=0). Up to three test integers are computed using a modified version of Table 3: replace each instance of $R_{n-1}$ by $R_{n-1-2t}$ and $R_n$ by $R_{n-2t}$.

Finally, note that if t=0, the previous two paragraphs handle the case where k is odd, to the generalized algorithm runs through the set

{ ..., -28, -23, -15, -7, 1, 4, 9, 16, 17, 25, 33, 36} of integers $k = 4^t k'$ with $t >= 0$ and $k' \equiv 1 \bmod 8$. About one-sixth of al integers in any large symmetric range qualify, empirically yielding 2.67 test integers per k on average. Some examples are shown in Table 4. The first two have 24 consecutive ones past the binary point, and each square root differs from the nearest 24-bit integer by less than $2^{-20}$.

TABLE 4

Boundary Cases for Square Root

| $2^{n-i}x$ | $\sqrt{2^{n-i}x}$ |
|---|---|
| $2^{23} \times 8388610$ | 8388608.99999994... |
| 56800002 | 4b000000_ffffff0... |
| $2^{24} \times 16777214$ | 16777214.99999997... |
| 577ffffe | 4b7ffffe_ffffff7... |
| $2^{23} \times 8388612$ | 8388609.9999997... |
| 56800004 | 4b000001_ffffffc... |
| $2^{24} \times 16777212$ | 16777213.9999998... |
| 577ffffc | 4b7ffffd_ffffffd... |
| $2^{23} \times 11946704$ | 10010805.0000003... |
| 56b64ad0 | 4b18c0b5_000005... |

TABLE 4-continued

Boundary Cases for Square Root

| $2^{n-i}x$ | $\sqrt{2^{n-i}x}$ |
|---|---|
| $2^{23} \times 14321479$ | 10960715.0000003... |
| 56da8747 | 4b273f4b_000005... |
| $2^{24} \times 13689673$ | 15155019.0000002... |
| 5750e349 | 4b673f4b_000003... |
| $2^{23} \times 8388614$ | 8388610.9999994... |
| 56800006 | 4b000002_fffff7... |
| $2^{24} \times 16777210$ | 16777212.9999997... |
| 577ffffa | 4b7ffffc_ffffffb... |
| $2^{23} \times 10873622$ | 9550631.0000007... |
| 56a5eb16 | 4b11bb27_00000d... |

FIGS. 14A–D: Testing the Square Root Logic

Processing steps used by a preferred embodiment to test whether a floating-point logic correctly performs directed roundings when finding square roots are shown in FIGS. 14A, 14B, 14C, and 14D. These four figures are logically similar, differing only in which test case from Table 3 is used to test the logic. Hence, an overview of this figures has been provided and all figures will be explained together.

In general, the processing computes a test integer x from a known solution z (step 1402). The embodiment tests the logic by comparing the logic's directed rounding value for the square root of x with the correct value (step 1404). This process continues for all solutions found for a given k (step 1406). To rigorously test the logic, many k are chosen, so that many trials are had.

Figure 14A:
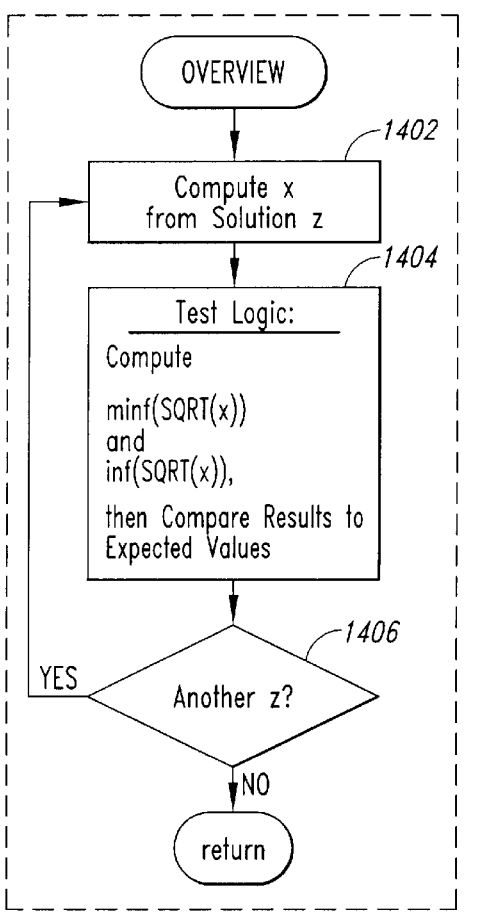
Figure 14B:
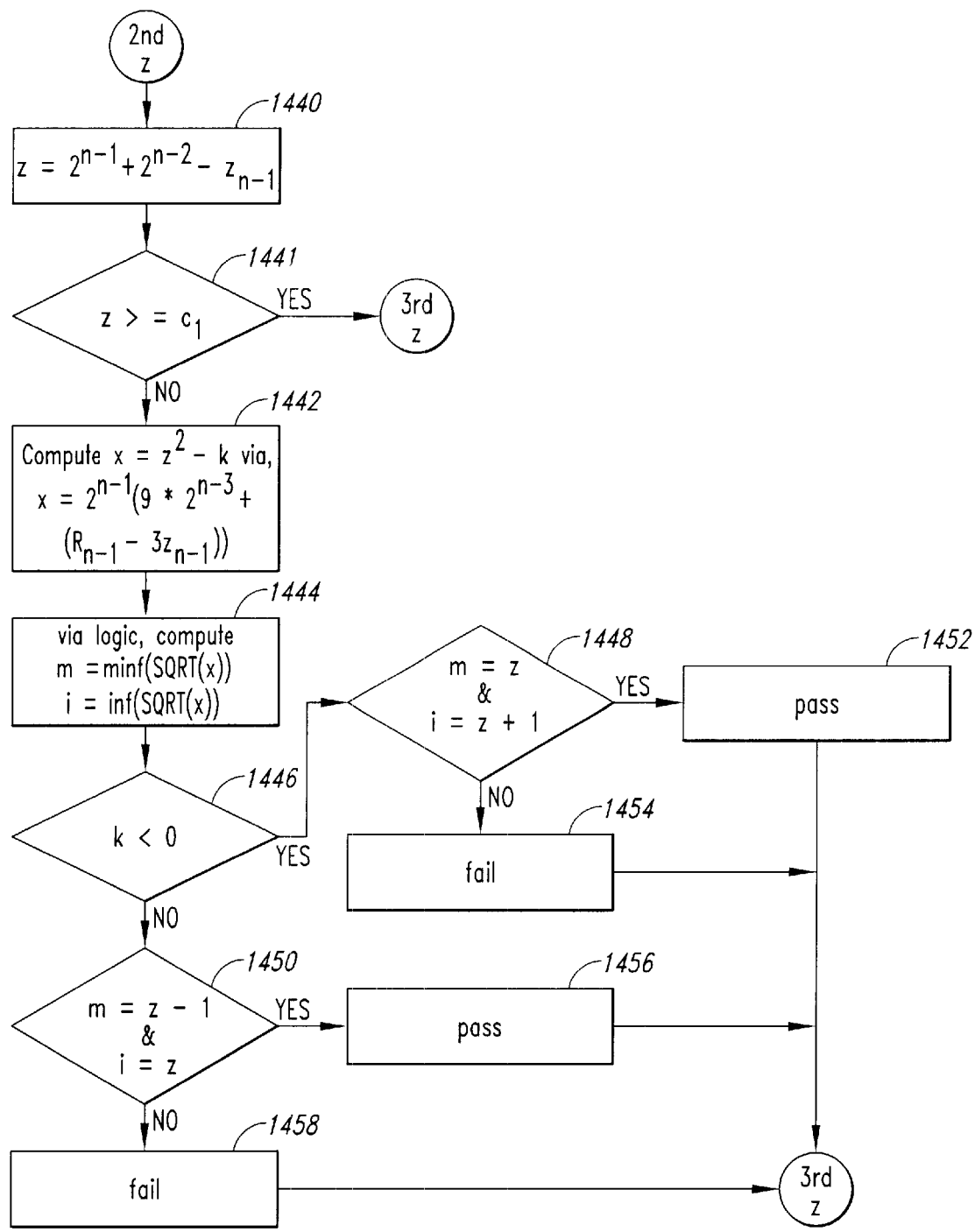
Figure 14C:
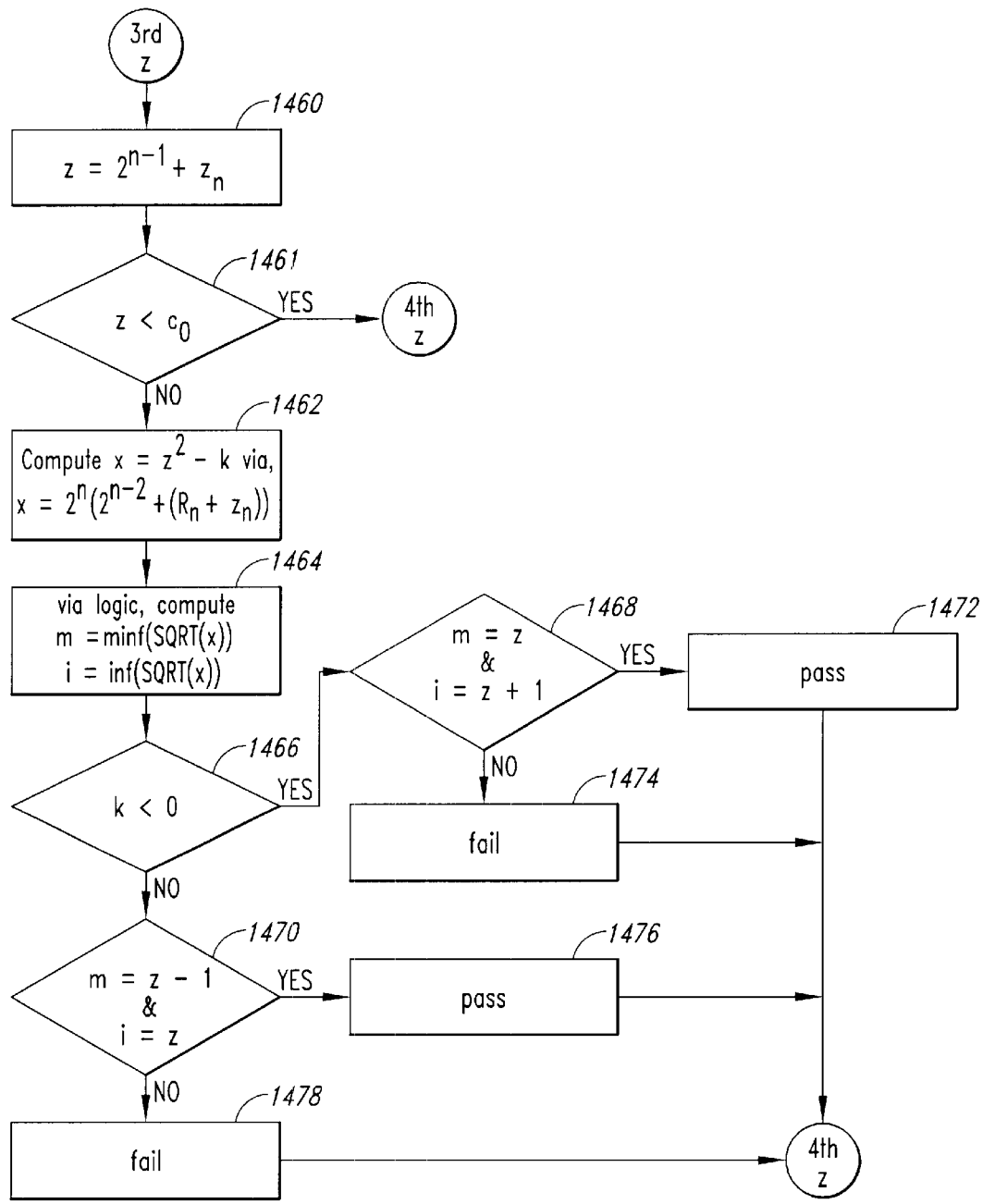
Figure 14D:
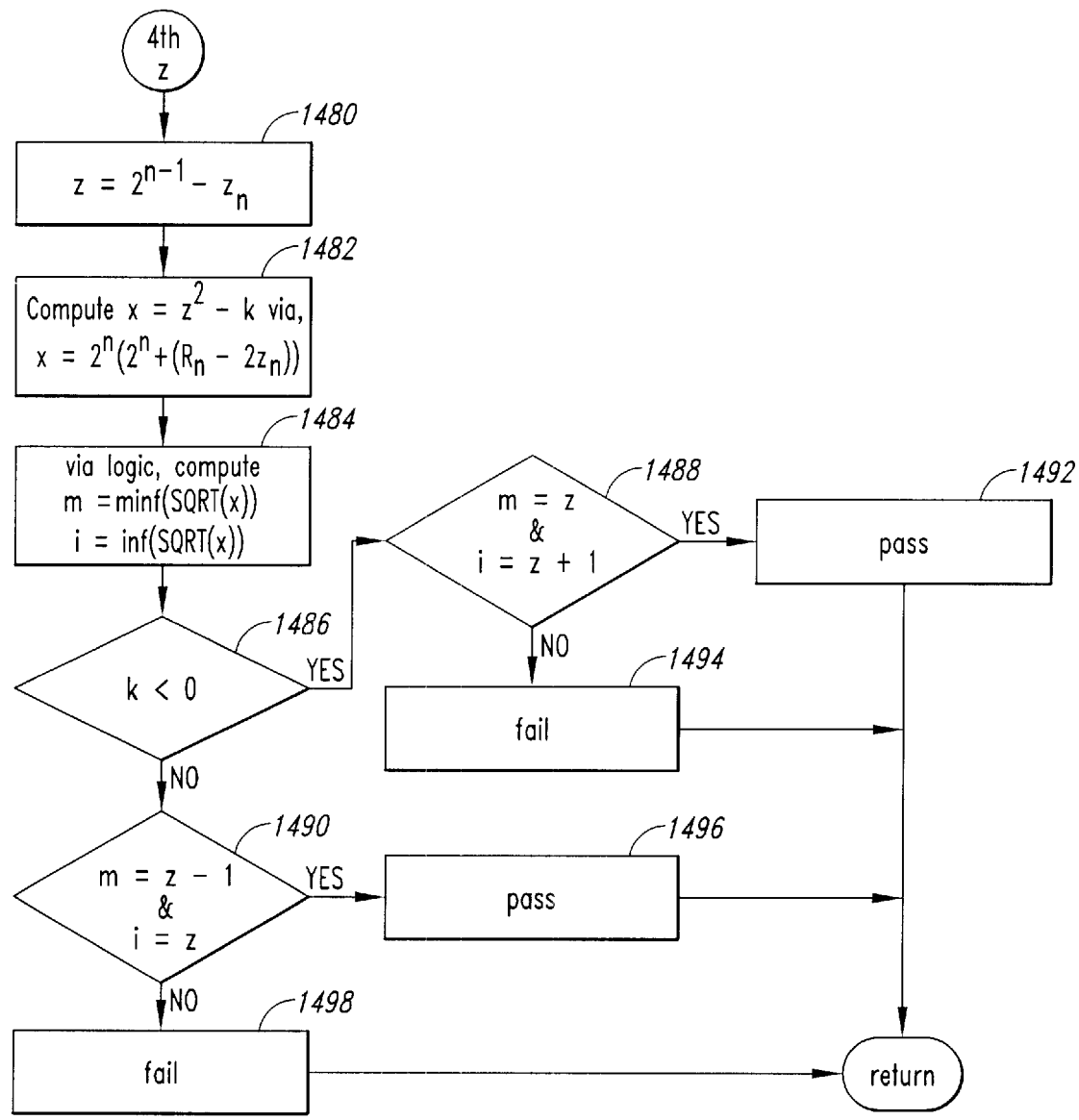

In more detail, processing begins by storing the two constants, $c_0$ and $c_1$, which are used to determine whether solutions $s_2$ and $r_3$ are admissible (step 1410). Next, a solution z is selected, e.g., a solution from Table 3 (steps 1420, 1440, 1460, 1480). In FIGS. 14B and 14C, the chosen solution is tested against the respective constant, $c_1$ and $c_0$, to determine the admissibility of solutions $s_2$ and $r_3$ (steps 1441, 1461). The test integer x is then calculated from the chosen solution, via $x = z^2 - k$ (steps 1422, 1442, 1462, 1482, see also Table 3). The logic then computes its directed rounding values for the square root of the test integer (steps: 1424, 1444, 1464, 1484). The embodiment evaluates the sign of k to determine the correct directed rounded values for the square root of the test integer (steps 1426, 1428, 1430; 1446, 1448, 1450; 1466, 1468, 1470; 1486, 1488, 1490). The correct values are then compared to the logic's value to discern whether the logic has correctly rounded (steps 1432, 1434, 1436, 1438; 1452, 1454, 1456, 1458; 1472, 1474, 1476, 1478; 1492, 1494, 1496, 1498). Once all the solutions are tested, the processing is complete. Another k is then selected so that more solutions can be derived.

The above-described embodiments thus provide methods and systems for generating test data for three fundamental operations by using number theory lifting techniques. The derived test cases are used to reinforce suspicion that an algorithm or hardware design conforms to the expectations for directed rounding imposed by the IEEE standard for binary arithmetic.

In preferred embodiments, no intermediate operations depend upon rounded sums, differences, or products. Therefore, programs or other digital logic used to encode and practice preferred embodiments require little beyond exact addition and subtraction, along with multiplication by powers of two and small constants. The correctly rounded results for validation are apparent without extra work, and further tests can be finessed from the multiplication case at no cost.

The above description will enable those skilled in the art to make numerous modifications to the described embodiments without departing from the spirt and scope of the claimed invention. Indeed, the chosen embodiments were selected so others could best utilize the invention by making such modifications to tailor the invention to their particular needs. The description therefore should not be read as limiting the invention to the embodiments explained herein.

For example, the described embodiments produced test data in conjunction with testing the logic. Alternative embodiments could store the test data and associated correctly rounded results for later testing.

The preferred embodiments were also described as testing nine combinations of mathematical operations and directed roundings. That is, three operations were examined—multiplication, division, and square root—and each operation was tested with three directed rounding modes—truncate, round-towards-minus infinity, and round-towards-positive infinity. Alternative embodiments could allow users to select any subset of these combinations. This would be advantageous to focus testing on a combination for which the logic was known to yield incorrect results.

Further, in the preferred embodiments, division tests were realized as offshoots for solving a sequence of congruence equations that were recast from boundary conditions for multiplication cases. Those skilled in the art, however, could employ the inventive techniques disclosed herein to produce division tests directly by solving a sequence of boundary cases for division cases.

And although the preferred embodiments describe relationships between boundary conditions and test cases in terms of integer equations, those skilled in the art will realize that it is not essential that the equations involve only relationships among integers.

The descriptive terms used throughout the description should not be used to limit the invention, for such terms do not singularly define the invention. Rather, it is the properties that these terms represent that are important. So long as these properties are used it makes little difference what terminology is used to refer to them. The invention therefore is not circumvented by alterations in terminology or other modifications that read on the appended claims and their equivalents.

What is claimed is:

1. A computer-readable medium containing computer instructions that, when executed, test a floating-point logic that is used in a computer system having a precision of n-bits, the medium comprising:
   instructions that, when executed, produce a test value that, when applied to a mathematical operation, creates a number lying near a directed rounding boundary condition;
   instructions that, when executed, provide for receiving a rounded value that was produced via the floating point logic when the logic applied the test value to the mathematical operation;
   instructions that, when executed, produce an expected rounded value for the directed rounding boundary condition; and
   instructions that, when executed, compare the received rounded value with the expected rounding value.

2. The computer-readable medium of claim 1 wherein the instructions that, when executed, produce the test value do so by solving a sequence of congruence equations that are related to an equation corresponding to the directed rounding condition.

3. The computer-readable medium of claim 2 wherein the mathematical operation is a multiplication operation, the medium further comprising:
   instructions that, when executed, test the logic for its accuracy in division using operands obtained when solving the sequence of congruence equations that represent the directed rounding boundary condition for the multiplication operation.

4. The computer-readable medium of claim 1 wherein the mathematical operation comprises a multiplication operation of an x-value and a y-value and wherein the instructions that, when executed, produce the test value comprise instructions that, when executed, solve a series of congruence equations for odd and even x- and y-values.

5. The computer-readable medium of claim 1 wherein the mathematical operation comprises a square root operation that derives the square root of an integer x, which is defined as $x=z^2-k$, where z in an n-bit value and k is a smaller value and wherein the instructions that, when executed, produce the test value comprise instructions that, when executed, solve a series of congruence equations for odd and even k values.

6. A testing device for testing the accuracy of a floating-point logic, the testing device comprising:
   a component that produces a test value that, when performed on by a mathematical operation, yield a number that lies near a directed mode boundary condition;
   a component that receives a directed rounded value from the floating point logic, the directed rounded value the logic's representation of the number that lies near the directed mode boundary condition;
   a component that produces a correctly rounded value for the test value; and
   a component that determines that the floating point logic is accurate when the a received directed rounded value equals the correctly rounded value and that determines that the floating point logic is inaccurate when the received directed rounded value does not equals the correctly rounded value.

7. The testing device of claim 6 wherein the component that produces the test value produces a multiplication test value, and from that multiplication test value, derives a division test value.

8. The testing device of claim 6 wherein the component that produces the test value produces a multiplication test value, and from that multiplication test value, derives a square root test value.

9. An apparatus for testing the accuracy of a floating-point logic, the apparatus comprising:
   means for identifying a bit pattern that represents a boundary condition of a mathematical operation for a directed rounding function;
   means for reformulating the identified bit pattern in terms of an integer equation;
   means for recasting the integer equation as a series of congruence equations;
   means for implementing a recurrence to produce a solution to the series of congruence equations;
   means for determining a test value from the solution;
   means for receiving a rounded value from the floating point logic, the received value being computed by performing the mathematical operation on the test value;
   means for identifying an expected directed rounding value for a result that is obtained when the mathematical operation is performed on the test value; and means for comparing the received rounded value with the expected directed rounding value to evaluate the accuracy of the logic.

10. The apparatus of claim 9, the apparatus further comprising:

means for eliminating terms from the production of the solution when those terms cannot be exactly expressed within the precision of the computer system.

11. In a computer system having a precision of n-bits, a method for testing a floating-point logic, the method comprising the steps of:

identifying a bit pattern that represents a directed rounding mode boundary condition for a mathematical operation;

reformulating the identified bit pattern in terms of an integer equation;

recasting the integer equation as a series of congruence equations;

implementing a recurrence to provide a solution to the series of congruence equations;

determining a test integer from the solution;

receiving a directed rounding value that the logic produced by performing for the mathematical operation on the test integer;

identifying a correctly rounded value for the test integer when the mathematical operation is performed on the test integer; and comparing the directed rounded value with the correctly rounded value to evaluate the accuracy of the logic.

12. The method of claim 11 wherein the step of implementing a recurrence to provide a solution to the series of congruence equations comprises the steps of producing intermediate terms and restricting all such terms to magnitudes that can be exactly expressed within the precision of the computer system.

13. The method of claim 11 wherein the step of implementing a recurrence to provide a solution to the series of congruence equations comprises the step of identifying the solution as $x=2^{n-1}+x_{n-1}$ and $p=y+p_{n-1}$; and wherein the step of identifying a correctly rounded value for the test integer comprises the step of identifying the correctly rounded value of minf(xy) to be $2^{n-1}(p-1)$.

14. The method of claim 11 wherein the step of implementing a recurrence to provide a solution to the series of congruence equations comprises the step identifying the solution as $x=2^{n-1}+x_{n-1}$ and $p=y+p_{n-1}$; and wherein the step of identifying a correctly rounded value for the test integer comprises the step of identifying the correctly rounded value of inf(xy) to be $2^{n-1}p$.

15. The method of claim 11 wherein the step of implementing a recurrence to provide a solution to the series of congruence equations comprises the step of identifying the solution as $x=2^{n-1}+x_{n-1}$ and $p=(y+p_{n-1})/2$; and wherein the step of identifying a correctly rounded value for the test integer comprises the steps of steps of determining that $y+p_{n-1}>2^n$ and identifying the correctly rounded value of minf(xy) to be $2^n(p-1)$.

16. The method of claim 11 wherein the step of implementing a recurrence to provide a solution to the series of congruence equations comprises the step of identifying the solution as $x=2^{n-1}+x_{n-1}$ and $p=(y+p_{n-1})/2$; and wherein the step of identifying a correctly rounded value for the test integer comprises the step of identifying the correctly rounded value of inf(xy) to be $2^n p$.

17. The method of claim 11 wherein the step of implementing a recurrence to provide a solution to the series of congruence equations comprises the step of identifying the solution as $x=2^{n-1}+x_{n-1}$ and $p=(y+p_{n-1})/2$; and wherein the step of identifying a correctly rounded value for the test integer comprises the steps of determining that $y+p_{n-1}=2^n$ and identifying the correctly rounded value of minf(xy) to be $(2^n-1)p$.

18. The method of claim 11 wherein the step of implementing a recurrence to provide a solution to the series of congruence equations comprises the step of identifying the solution as $x=2^n-x_{n-1}$ and $p=2y-p_{n-1}$; and wherein the step of identifying a correctly rounded value for the test integer comprises the step of identifying the correctly rounded value of minf(xy) to be $2^{n-1}p$.

19. The method of claim 11 wherein the step of implementing a recurrence to provide a solution to the series of congruence equations comprises the step of identifying the solution as $x=2^n-x_{n-1}$ and $p=2y-p_{n-1}$; and wherein the step of identifying a correctly rounded value for the test integer comprises the step of identifying the correctly rounded value of inf(xy) to be $2^{n-1}(p+1)$.

20. The method of claim 11 wherein the step of implementing a recurrence to provide a solution to the series of congruence equations comprises the step of identifying the solution as $x=2^n-x_n$ and $p=y-p_n$; and wherein the step of identifying a correctly rounded value for the test integer comprises the step of identifying the correctly rounded value of minf(xy) to be $2^n p$.

21. The method of claim 11 wherein the step of implementing a recurrence to provide a solution to the series of congruence equations comprises the step identifying the solution as $x=2^n-x_n$ and $p=y-p_n$; and wherein the step of identifying a correctly rounded value for the test integer comprises the step of identifying the correctly rounded value of inf(xy) to be $2^n(p+1)$.

22. The method of claim 11 wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_{n-1}$, and (d) computing x via $x=2^{n-1}(2^{n-1}+(R_{n-1}+2z_{n-1}))$; and wherein the step of identifying a correctly rounded value for the test integer comprises the steps of determining that k<0 and identifying the correctly rounded value of minf(SQRT(x)) to be z.

23. The method of claim 11 wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_{n-1}$, and (d) computing x via $x=2^{n-1}(2^{n-1}+(R_{n-1}+2z_{n-1}))$; and wherein the step of identifying a correctly rounded value for the test integer comprises the steps of determining that k<0 and identifying the correctly rounded value of inf(SQRT(x)) to be z+1.

24. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_{n-1}$, and (d) computing x via $x=2^{n-1}(2^{n-1}+(R_{n-1}+2z_{n-1}))$; and
wherein the step of identifying a correctly rounded value for the test integer comprises the steps of determining that k>0 and identifying the correctly rounded value of minf(SQRT(x)) to be z−1.

25. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_{j\ and\ zj}^2-k=2^j R_j$, where j runs from 3 to n, (c) identifying the solution as $z=2^{n-1}+z_{n-1}$, and (d) computing x via $x=2^{n-1}(2^{n-1}+(R_{n-1}+2z_{n-1}))$; and
wherein the step of identifying a correctly rounded value for the test integer comprises the steps of determining that k>0 and identifying the correctly rounded value of inf(SQRT(x)) to be z.

26. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+2^{n-2}-z_{n-1}$, and (d) computing x via $x=2^{n-1}(9*2^{n-3}+(R_{n-1}-3z_{n-1}))$; and
wherein the step of identifying a correctly rounded value for the test integer comprises the steps of determining that k<0 and identifying the correctly rounded value of minf(SQRT(x)) to be z.

27. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+2^{n-2}-z_{n-1}$, and (d) computing x via $x=2^{n-1}(9*2^{n-3}+(R_{n-1}-3z_{n-1}))$; and
wherein the step of identifying a correctly rounded value for the test integer comprises the steps of determining that k<0 and identifying the correctly rounded value of inf(SQRT(x)) to be z+1.

28. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+2^{n-2}-z_{n-1}$, and (d) computing x via $x=2^{n-1}(9*2^{n-3}+(R_{n-1}-3z_{n-1}))$; and
wherein the step of identifying a correctly rounded value for the test integer comprises the steps determining that k>0 and identifying the correctly rounded value of minf(SQRT(x)) to be z−1.

29. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+2^{n-2}-z_{n-1}$, and (d) computing x via $x=2^{n-1}(9*2^{n-3}+(R_{n-1}-3z_{n-1}))$; and
wherein the step of identifying a correctly rounded value for the test integer comprises the steps of determining that k>0 and identifying the correctly rounded value of inf(SQRT(x)) to be z.

30. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_n$, and (d) computing x via $x=2^n(2^{n-2}+(R_n+z_n))$; and
wherein the step of identifying a correctly rounded value for the test integer comprises the steps of determining that k<0 and identifying the correctly rounded value of minf(SQRT(x)) to be z.

31. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_n$, and (d) computing x via $x=2^n(2^{n-2}+(R_n+z_n))$; and
wherein the step of identifying a correctly rounded value for the test integer comprises the steps determining that k<0 and identifying the correctly rounded value inf(SQRT(x)) to be z+1.

32. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where i runs from 3 to n, (c) identifying the solution as $z=2^{n-1}+z_n$, and (d) computing x via $x=2^n(2^{n-2}+(R_n+z_n))$; and
wherein the step of identifying a correctly rounded value for the test integer comprises the steps of determining that k>0 and identifying the correctly rounded value of minf(SQRT(x)) to be z−1.

33. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^{n-1}+z_n$, and (d) computing x via $x=2^n(2^{n-2}+(R_n+z_n))$; and
wherein the step of identifying a correctly rounded value for the test integer comprises the steps determining that k>0 and identifying the correctly rounded value of inf(SQRT(x)) to be z.

34. The method of claim 11
wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2-k=2^j R_j$, where j runs from 3 to n, (c) identifying the solution as $z=2^n-z_n$, and (d) computing x via $x=2^n(2^n+(R_n-2z_n))$; and wherein the step of identifying a correctly rounded value for the test integer comprises the steps of determining that k<0 and identifying the correctly rounded value of minf(SQRT(x)) to be z.

35. The method of claim 11 wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2 - k = 2^j R_j$, where j runs from 3 to n, (c) identifying the solution as $z = 2^n - z_n$, and (d) computing x via $x = 2^n(2^n + (R_n - 2z_n))$; and wherein the step of identifying a correctly rounded value for the test integer comprises the steps of determining that k<0 and identifying the correctly rounded value of the expected value of inf(SQRT(x)) to be z+1.

36. The method of claim 11 wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2 - k = 2^j R_j$, where j runs from 3 to n, (c) identifying the solution as $z = 2^n - z_n$, and (d) computing x via $x = 2^n(2^n + (R_n - 2z_n))$; and wherein the step of identifying a correctly rounded value for the test integer comprises the steps of determining that k>0 and identifying the correctly rounded value of minf(SQRT(x)) to be z−1.

37. The method of claim 11 wherein the step of implementing a recurrence to provide a solution to the series of congruence equations comprises the steps of (a) selecting a k value, (b) solving the sequence of congruence equations defined by $z_j^2 \equiv k \mod 2^j$ for $z_j$ and $z_j^2 - k = 2^j R_j$, where j runs from 3 to n, (c) identifying the solution as $z = 2^n - z_n$, and (d) computing x via $x = 2^n(2^n + (R_n - 2z_n))$; and wherein the step of identifying a correctly rounded value for the test integer comprises the steps of determining that k>0 and identifying the correctly rounded value of inf(SQRT(x)) to be z.

\* \* \* \* \*

UNITED STATES PATENT AND TRADEMARK OFFICE
CERTIFICATE OF CORRECTION

PATENT NO. : 6,427,160 B1
DATED : July 30, 2002
INVENTOR(S) : Parks et al.

It is certified that error appears in the above-identified patent and that said Letters Patent is hereby corrected as shown below:

<u>Column 18,</u>
Line 35, change "the a" to -- the --.
Line 38, change "equals" to -- equal --.

Signed and Sealed this

Fifteenth Day of June, 2004

JON W. DUDAS
*Acting Director of the United States Patent and Trademark Office*